(12) United States Patent
Hahn et al.

(10) Patent No.: US 7,934,098 B1
(45) Date of Patent: Apr. 26, 2011

(54) SYSTEM AND METHOD FOR CAPTURING AND APPLYING A LEGAL SIGNATURE TO DOCUMENTS OVER A NETWORK

(75) Inventors: Douglas G. Hahn, Evergreen, CO (US); Christopher A. Hahn, Evergreen, CO (US); Janet K. Hahn, Evergreen, CO (US); Randal L. Hodson, Evergreen, CO (US); Sean D. Kerstiens, Westminster, CO (US); John K. Lange, Evergreen, CO (US); Vincent J. Pascarella, Golden, CO (US)

(73) Assignee: Alliedbarton Security Services LLC, King of Prussia, PA (US)

( * ) Notice: Subject to any disclaimer, the term of this patent is extended or adjusted under 35 U.S.C. 154(b) by 1485 days.

(21) Appl. No.: 11/103,708

(22) Filed: Apr. 11, 2005

(51) Int. Cl.
*H04L 9/32* (2006.01)
(52) U.S. Cl. .................. 713/176; 713/180
(58) Field of Classification Search .......... 713/176, 713/173, 177, 178, 180; 380/34, 46
See application file for complete search history.

(56) References Cited

U.S. PATENT DOCUMENTS

| | | | | |
|---|---|---|---|---|
| 5,465,299 A * | 11/1995 | Matsumoto et al. | | 713/176 |
| 5,544,255 A * | 8/1996 | Smithies et al. | | 382/119 |
| 5,587,560 A * | 12/1996 | Crooks et al. | | 178/18.03 |
| 5,647,017 A * | 7/1997 | Smithies et al. | | 382/119 |
| 5,748,738 A * | 5/1998 | Bisbee et al. | | 713/176 |
| 5,818,955 A * | 10/1998 | Smithies et al. | | 382/115 |
| 5,825,880 A * | 10/1998 | Sudia et al. | | 713/180 |
| 5,892,824 A * | 4/1999 | Beatson et al. | | 713/186 |
| 6,064,751 A * | 5/2000 | Smithies et al. | | 382/115 |
| 6,091,835 A * | 7/2000 | Smithies et al. | | 382/115 |
| 6,219,423 B1 * | 4/2001 | Davis | | 380/268 |
| 6,237,096 B1 * | 5/2001 | Bisbee et al. | | 713/178 |
| 6,307,955 B1 * | 10/2001 | Zank et al. | | 382/121 |
| 6,307,956 B1 * | 10/2001 | Black | | 382/124 |
| 6,327,656 B2 * | 12/2001 | Zabetian | | 713/176 |
| 6,381,344 B1 * | 4/2002 | Smithies et al. | | 382/115 |
| 6,687,390 B2 | 2/2004 | Avni et al. | | |
| 6,938,157 B2 * | 8/2005 | Kaplan | | 713/176 |
| 6,973,462 B2 * | 12/2005 | Dattero et al. | | 707/104.1 |

(Continued)

OTHER PUBLICATIONS

Alphatrust Home Page Electronic Signature, Digital Signature, and Electronic Signature Solutions, 1 page, Retrieved from website on Mar. 27, 2006 using Internet URL: <http://www.alphatrust.com>, Copyright 1998-2006 AlphaTrust Corporation, Dallas, Texas.

(Continued)

*Primary Examiner* — David Garcia Cervetti
(74) *Attorney, Agent, or Firm* — Cozen O'Connor

(57) ABSTRACT

An electronic signature capture system and process meets the legal requirements of a valid electronic signature while also providing electronically signed documents that have the appearance, and thus equivalent acceptability, of a traditional pen-and-ink signature. The documents can be signed using a mouse, a stylus, a touch screen, a graphics tablet, or other suitable input device to draw a signature analogue on the screen similar to signing a paper document with a pen. A fingerprint image, retinal scan image, or other similar biometric input may be captured in addition to or instead of a signature. The signature analogue is saved and linked to a particular user and to particular documents. The signature analogue may be combined with the document in a composite image file, or the signature analogue may be applied dynamically to appropriate document components to assemble an executed document as needed.

9 Claims, 15 Drawing Sheets

U.S. PATENT DOCUMENTS

| | | | |
|---|---|---|---|
| 7,080,057 B2 * | 7/2006 | Scarborough et al. | 706/60 |
| 7,310,626 B2 * | 12/2007 | Scarborough et al. | 706/60 |
| 7,346,541 B1 * | 3/2008 | Cuttler et al. | 705/11 |
| 7,363,505 B2 * | 4/2008 | Black | 713/186 |
| 7,558,767 B2 * | 7/2009 | Scarborough et al. | 706/21 |
| 7,562,059 B2 * | 7/2009 | Scarborough et al. | 706/21 |
| 7,568,104 B2 * | 7/2009 | Berryman et al. | 713/176 |
| 2001/0029482 A1 * | 10/2001 | Tealdi et al. | 705/38 |
| 2002/0042786 A1 * | 4/2002 | Scarborough et al. | 706/21 |
| 2002/0046199 A1 * | 4/2002 | Scarborough et al. | 706/21 |
| 2002/0052773 A1 * | 5/2002 | Kraemer et al. | 705/9 |
| 2002/0052896 A1 | 5/2002 | Streit et al. | |
| 2002/0069179 A1 * | 6/2002 | Slater et al. | 705/67 |
| 2002/0082857 A1 | 6/2002 | Skordin et al. | |
| 2002/0095440 A1 * | 7/2002 | Burgess et al. | 707/513 |
| 2002/0123921 A1 * | 9/2002 | Frazier | 705/9 |
| 2002/0143711 A1 * | 10/2002 | Nassiri | 705/76 |
| 2002/0169630 A1 | 11/2002 | Dattero et al. | |
| 2003/0012374 A1 * | 1/2003 | Wu et al. | 380/44 |
| 2003/0026462 A1 | 2/2003 | Chung et al. | |
| 2003/0028495 A1 * | 2/2003 | Pallante | 705/78 |
| 2003/0065923 A1 * | 4/2003 | Parry | 713/176 |
| 2003/0078880 A1 * | 4/2003 | Alley et al. | 705/38 |
| 2003/0208384 A1 | 11/2003 | Nelson et al. | |
| 2003/0221105 A1 * | 11/2003 | Bajaj | 713/176 |
| 2004/0049463 A1 * | 3/2004 | Kwon | 705/50 |
| 2004/0064453 A1 * | 4/2004 | Ruiz et al. | 707/9 |
| 2004/0111371 A1 * | 6/2004 | Friedman | 705/42 |
| 2004/0208383 A1 | 10/2004 | Bossen | |
| 2004/0216039 A1 * | 10/2004 | Lane et al. | 715/511 |
| 2004/0243428 A1 * | 12/2004 | Black et al. | 705/1 |
| 2004/0250070 A1 * | 12/2004 | Wong | 713/170 |
| 2005/0015600 A1 * | 1/2005 | Miyazaki et al. | 713/176 |
| 2005/0102520 A1 * | 5/2005 | Baxter et al. | 713/176 |
| 2005/0114279 A1 * | 5/2005 | Scarborough et al. | 706/21 |
| 2005/0122209 A1 * | 6/2005 | Black | 340/5.52 |
| 2005/0216742 A1 * | 9/2005 | Wong et al. | 713/176 |
| 2005/0240770 A1 * | 10/2005 | Lane et al. | 713/176 |
| 2005/0246299 A1 * | 11/2005 | Scarborough et al. | 706/21 |
| 2005/0273350 A1 * | 12/2005 | Scarborough et al. | 705/1 |
| 2005/0273453 A1 * | 12/2005 | Holloran | 707/1 |
| 2006/0034494 A1 * | 2/2006 | Holloran | 382/116 |
| 2006/0080116 A1 * | 4/2006 | Maguire et al. | 705/1 |
| 2006/0159313 A1 * | 7/2006 | Hicks et al. | 382/119 |
| 2006/0161779 A1 * | 7/2006 | Geoffrey | 713/176 |
| 2006/0161780 A1 * | 7/2006 | Berryman et al. | 713/176 |
| 2006/0212708 A9 * | 9/2006 | Wong et al. | 713/176 |
| 2006/0215886 A1 * | 9/2006 | Black | 382/124 |
| 2006/0224895 A1 * | 10/2006 | Mayer | 713/176 |
| 2008/0260287 A1 * | 10/2008 | Berryman et al. | 382/284 |

OTHER PUBLICATIONS

E-Lock Technologies, Home Page Digital Signature Software . . . , 2 pages, Retrieved from website on Mar. 27, 2006 using Internet URL: <http://www.elock.com>, Copyright 2006 www.elock.com, Frontier Technologies Corporation, McLean, Virginia.

E-Lock Technologies, E-Lock Prosigner—Introduction, 2 pages, Retrieved from website on Mar. 28, 2006 using Internet URL: <http://www.elock.com/prosigner/html>, Copyright 2006 www.elock.com, Frontier Technologies Corporation, McLean, Virginia.

Thawte, Home Page SSL Digital Certificates from thawte the Global Certificate Authority, 1 page, Retrieved from website on Mar. 27, 2006 using Internet URL:<http://thawte.com>, Copyright 1995-2006, thawte, Inc., Cape Town, South Africa.

Verisign, Inc. Home Page VeriSign—Security (SSL Certificates), Communications, and Information Services and Managed PKI Services—Public Key Infrastructure (PKI) from VeriSign, Inc., 3 pages, Retrieved from website on Mar. 27, 2006 using Internet URL:<http://www.verisign.com>, and Internet URL:<http://www.verisign.com/products-services/security-services/pki/index.html>, respectively, Copyright 1995-2006, VeriSign, Inc., Mountain View, California.

E-Signature, Home Page and E-Signature Custom Signature Fonts, 4 pages, Retrieved from website on Mar. 27, 2006 using Internet URL:<http://www.e-signature.com/> and <http://www.e-signature.com/en/prod01_en.htm>, respectively, Copyright 1995-2006, E-Signature, Ottawa, Ontario, Canada.

Silanis Technology, Inc. Electronic Signature and Digital Signature Software Solutions and Resource Center, 8 pages, Retrieved on Mar. 28, 2006, using Internet URL:<http://www.silanis.com/site/resource_center/knowledge_center/index.php?topic=signing_features>, Copyright 2001-2006, Silanis Technology, Inc., St. Laurent, Quebec, Canada.

Entrust, Entrust Resources:Entrust TruePass Features and Benefits and Frequently Asked Questions, 5 pages, Retrieved from website on Mar. 27, 2006 using Internet URL:<http://www.entrust.com/internet-security-software/features.htm> and <http://www.entrust.com/internet-security-software/faqs.htm>, respectively, Entrust, Addison, Texas.

Oh, J., CNN.com, E-Signature Act May Drive Demand for Authentication Technology, Sep. 12, 2000, Retrieved from website on Mar. 27, 2006 using Internet URL:<http://archives.cnn.com/2000/TECH/computing/09/12/esigs.drive.demand.idg/index.html>, Cable News Network LP, LLLP, A Time Warner Company, USA.

* cited by examiner

Disclosure, Authorization Consent & Release Forms   290

National Disclosure, Authorization Consent & Release — 292
Please be advised that we and/or our investigating agent, may obtain consumer reports and/or investigative consumer reports about you for employment purposes, including without limitation, for the purposes of evaluating you for employment, promotion, reassignment and retention as an employee, at any time prior to or during your employment and without giving you any additional notice. Pursuant to the Fair credit Reporting Act (FCRA), consumer reports and/or investigative consumer reports (reference checks) may include, without limitation, information about your character, general reputation, personal characteristics and mode of living, whichever

Electronic Signature
In this section and in the following section you will be electronically signing Your application. By electronically signing the application you authorize your potential new employer and its investigating agent to use the information you have provided in the application to run the necessary background checks to determine your eligibility for the position for which you have applied.

The application will be signed electronically (according to the <u>Electronic Signatures In Global And National Commerce Act</u>) using any combination of alpha/numeric characters that you designate to serve the function of your electronic signature, preceded and followed by the forward slash (/) symbol. Acceptable "signatures" could include: /john doe/; /Fred J Smith/; and /fjs/. Your signature will be stamped with the current date and time and with the IP address of the computer or network from which you are connecting. Using these guidelines, please type your name as you want it to appear in the Electronic Signature box below. The IP Address listed was taken from the information in your web Browser. You may not change this value.

Signature (Format: /Name/)   293    IP Address   296

/Steve Jones/                                12.345.678.910

298           294

Attestation
☑ By entering my electronic signature above, checking the box to the left, signing my signature in the space provided the Pen And Ink Signature section, I hereby acknowledge and agree to the terms and conditions of the Background Investigation Agreement ("Agreement") and understand that my click and my electronic signature clearly expresses my intent to electronically sign this Agreement and it is wholly equivalent to a pen and ink signature.

( SAVE DATA )   299

SYSTEM AND METHOD FOR CAPTURING AND APPLYING A LEGAL SIGNATURE TO DOCUMENTS OVER A NETWORK

BACKGROUND OF THE INVENTION

1. Field of the Invention

This invention relates to a system and method for capturing a signature and applying the signature to one or more documents to meet legal and operational signature requirements.

2. Description of the Related Art

With the advent of worldwide computer networking via the Internet and the creation of an electronic commerce industry, there has been a related effort to ensure that electronic transactions can be completed and binding contracts formed. One of the foundations for forming a binding contract or completing a transaction is standards for electronic signatures and digital signatures.

The terms "electronic signature" and "digital signature" are often confused. Electronic signatures refer to any method used to associate a person's identity with an electronic record. Digital signatures refer to a specific technology (using asymmetric cryptography) for binding a person's identity to an electronic record. Digital signatures are generally regarded as the most robust and secure method for creating electronic signatures. There are often additional requirements imposed by legislation, for example, an affirmative opt-in election to use e-signatures and e-records and consumer notices and abilities tests.

There is already a growing body of legislation throughout the United States, and the world regarding the use of electronic and digital signatures. At this time there is a combination of legislation regulating the use of electronic signatures within the 50 states, and at the national level. However, unlike traditional pen and paper signatures, electronic and/or digital signatures may not carry the force of law.

There are two general types of legislation on the subject of electronic signatures. The first type is technology neutral (i.e. it does not specify or require a particular technology for e-signatures). Examples of this type of legislation are the U.S. Federal E-SIGN (Electronic Signatures in Global and National Commerce) Act (October 2000) and the Uniform Electronic Transactions Act (UETA) passed in 47 U.S. states (through 2004).

The second type includes hybrid digital signature acts, which give special status to certain types of electronic signatures known as digital signatures created using public key cryptographic technology. These hybrid laws generally provide for the recognition of any reasonable electronic signature, but accord higher status to digital signatures that meet certain defined requirements. Examples of these types of laws are the European Union Digital Signature Directive and the Singapore Electronic Transactions Act.

While current federal law requires federal agencies and courts to accept legally compliant digital or electronic signatures and a handful of state laws have similar requirements with respect to state agencies and courts, most states do not have such laws and no law requires private businesses or private educational institutions to accept such signatures. There are also jurisdictional issues to consider. For example, the U.S. E-SIGN Act does not cover intra-state transactions (lack of federal jurisdiction), UCC transactions (other than UCC 2 & 2A), and international transactions (no enforceability across borders). Legal experts believe that a consistent and workable legal infrastructure for electronic signatures, at the statutory level, will remain elusive for many years to come.

In a number of industries there is both a legal requirement and an operational need to provide executed documents with a signature. In order to meet this need it has been proposed to use digital or other types of electronic signatures. Many of the technologies for creating a digital signature involve the custom creation of a font, for example, based upon an individual's handwriting. Some systems allow users to sign documents locally on their personal computer with specific software that locks the document from further editing. Other technologies include elaborate and expensive systems using certification authorities and Public Key Infrastructure (PKI) encryption technologies that require digital signatures.

There are several drawbacks to these existing systems. Primarily, such systems are expensive to install and maintain. Many of these systems also require installation and management of PKI and certification authorities, which often require users to obtain digital signatures, often through the mail. This significantly slows down the processing of users, for example, production of a background check for applicants for employment positions. These systems often focus on authentication of a signature against a database of existing signatures or focus on handwriting recognition of a captured signature. Additionally, such systems often emphasize local signature capture and storage, rather than a networked system, for example, across an Internet environment.

Furthermore, in some instances, although a document may be able to be provided with an electronic signature meeting the appropriate legal requirements, the entity requiring the signed document may not accept an electronic signature. Such entities often require a signature with the appearance of a traditional pen-and-ink signature.

For example, in the employment background screening industry there are legal requirements for a signed authorization permitting the background check. While employers are required to have a job applicant's signature on an authorization and other documents, a background screening company is not required by law to have a copy of the authorization. Most background screening companies do not require client/employers to provide them with the generic signed authorization with the initial order. However, in addition to the generic authorization, in order to solicit other specific information, other signed documents (e.g., state motor vehicle record authorization forms, state workers compensation history authorization forms, etc.) may be needed. Information sources or providers (e.g., employers, educational institutions, state workers compensation departments, state motor vehicle departments, etc.) often require copies of signed authorizations or other documents before they will provide background screening companies or employers with the information requested. Generally, background screening companies must either request signatures on such documents when a need arises or simply report back to the client/employer that they were unable to obtain the requested information due to the lack of the signed authorization.

In addition, many of these information sources, particularly previous employers and educational institutions, are not highly sophisticated and/or may refuse to accept digital signatures or standard electronic signatures (e.g., /Typed Name/). Previous attempts to address this problem generally involve mailing executed documents with pen-and-ink signatures, transmitting pen-and-ink signed documents via facsimile, or e-mailing scanned images of a pen-and-ink signed document. These solutions have a number of shortcomings, most significantly that fact they all must start with an original pen-and-ink signature.

As previously noted, while digital or electronic signatures may meet the legal requirements of a signature, they often fail to meet the operational requirements of a signature. In situations where a signature is used to access records or obtain information, many private (non-governmental) record sources and some state agencies and state courts refuse to accept a digital or electronic signature as a valid signature. A copy of a pen-and-ink signature or the equivalent thereof is often required.

The information included in this Background section of the specification, including any references cited herein and any description or discussion thereof, is included for technical reference purposes only and is not to be regarded subject matter by which the scope of the invention is to be bound.

SUMMARY OF THE INVENTION

The present invention solves the problems described above by providing an electronic signature capture system and process that meets the legal requirements of a valid electronic signature while also providing electronically signed documents that have the appearance, and thus equivalent acceptability, of a traditional pen-and-ink signature. This invention is intended as an alternative to the traditional pen- and ink-signature and is especially useful as an alternative to mailing or faxing hard copies of signed documents between an authorizing party and an intermediary service provider (e.g., between a prospective employee or employer and a background screening company). This technology allows for the simple and convenient electronic capture, storage, and transmission of signed documents that are the equivalent of a photocopy or facsimile of the document with a pen-and-ink signature.

This invention focuses on the legal and operational signature requirements. The main advantage of this invention is that it complies with the legal requirements of an electronic signature while also meeting the operational requirements of a pen-and-ink signature. A signature analogue created by this invention is the legal and operational equivalent of a pen-and-ink signature in appearance. Thus, this invention provides all of the advantages of an electronic signature, plus all of the advantages of a traditional pen-and-ink signature. In addition, this invention allows a user to apply a single signature to multiple documents. This invention creates a system that is simple, accessible, convenient, easy to use and inexpensive for users.

The present invention combines a signature capture and storage technology with document management technology and an Internet (or other network) transmission system by using common, existing technologies in a new way to achieve an unexpected result. This system allows documents to be completed, reviewed, and signed using, for example, only an Internet-enabled device, for example, a personal computer, a laptop computer, a personal digital assistant (PDA), or an Internet-enabled wireless telephone with a Web browser. The technology can be used any place in the world with a connection to the Internet or within any internal or other network. The documents can be signed using a mouse, a stylus, a touch screen, a graphics tablet, or other suitable input device to draw a signature analogue on the screen in a manner similar to signing a paper document with a pen. No special graphical input device is required; standard input devices used with personal computers and PDAs may be used to input the signature analogue. It is also contemplated that a fingerprint image, retinal scan image, facial photograph, or other similar biometric input may be used as a form of authentication of a document. For example, fingerprint imprints are often used as authentication along with a person's signature on a document. Further, in the future, other forms of biometric identification are likely to become more commonplace and the present invention is able to accommodate these shifts in established norms. Thus, the term signature analogue as used herein may sometimes encompass the use of biometric information for authentication.

In one exemplary implementation according to the present invention, a system user logs on to a secure Web site using a username and password. The user views a list of documents requiring completion and signature. The user completes whatever documents are required. The user provides a signature using a mouse, a stylus, a touch screen, a touch pad, a graphics tablet, or other suitable input device to sign the user's name in a designated signature space. A user can practice signing his name by clearing the signature space multiple times until an acceptable signature is created. Once the user is satisfied with his signature, he clicks a button that captures his signature and stores it in the system databases linked to the username and password. A fingerprint image, retinal scan image, or other similar biometric input may also be captured in addition to or in lieu of a signature analogue. Next, the user applies his captured signature analogue to the appropriate documents by clicking a check box next to each document title listed. Only documents that are explicitly checked by the user in this manner will be stored in the system and linked with the user's username and password. Failure to attach a signature analogue to any required document may result in a "process incomplete" message and the user will not be allowed to complete the process. The user may acknowledge a statement to the effect that the user intends to use his electronically captured signature analogue to sign each specific document.

After the user attaches his signature analogue to all required documents, these documents are linked to the user's saved signature analogue in the system. These individually signed documents are stored in the system database and linked to the user's username and password. The system may store both a graphical representation in an image format and a point-by-point representation of the user's signature analogue that can be used to redraw the user's signature analogue exactly as it was input by the movement of the user input device, e.g., a computer mouse. A second form of a legally valid electronic signature, e.g., the user's name between two slashes (/User Name/) may also be stored in the system database. A fingerprint image, retinal scan image, or other similar biometric input may be included in addition to or in lieu of the signature analogue image. The system may also store the IP address of the machine or network from which the user accessed the Web site, and the exact date and time that each document is signed.

In one form, the present invention is a system for capturing a signature analogue of a user and the intent of the user to execute a document. The system comprises a communication network and a processor. A network interface connects the communication network and the processor. A database is also connected with the processor. The database stores at least one document requiring legal execution by the user. The system also comprises a first means for capturing the signature analogue of the user. The means for capturing is implemented by the processor. The signature analogue is accessed via the network interface from a user interface over the communication network. The system further comprises a means for combining the signature analogue and the document to create a composite document image of a legally executed document.

In another form, the present invention is a method for executing documents over a network. A first interface with a signature capture box is generated, wherein the movements of a graphical interface device are represented as lines and curves in the signature capture box. The first interface is transmitted over a network to a user device for instantiation on the user device. A signature analogue file of the lines and curves in the signature capture box is received over the network. The signature analogue file is stored in a database. A second interface may also be generated with a list of documents for execution. The user's intent to execute one or more of the documents may be captured in the database. A document file is accessed from the database. The signature analogue file is combined with the document file to create a composite document image of a legally executed document. The composite document image is then output.

Another form of the invention is a computer readable medium containing instructions for instantiating a user interface for capturing a signature analogue for execution of at least one document. The instructions comprise providing a signature input interface with a signature capture box that represents the movement of a graphical input device at the user interface. The signature analogue corresponding to the movement of the graphical input device in the signature capture box is captured. The instructions may also provide for generating a selection interface with a list of documents for execution. A user's selection indicating intent to execute one or more of the documents is stored in the database. The signature analogue is then linked to a document file corresponding to the document. The signature analogue is then combined with the document file to create a composite document image of a legally executed document.

A further form of the invention is a method for obtaining executed release documents from an applicant for conducting a background investigation. The applicant is notified that a pre-employment background investigation requires execution of release documents. An applicant interface is provided for input and capture of application information. A release document selection interface is also provided through which the applicant can select particular release documents for execution. The applicant's selection of the particular release documents is stored. A signature input interface is then provided with a signature capture box that represents the movement of a graphical input device at the applicant interface. A signature analogue corresponding to the movement of the graphical input device in the signature capture box is captured. The signature analogue is then linked to the particular release documents selected by the applicant. A composite document image corresponding to each particular release document is then created. The signature analogue is combined with each particular release document, whereby each composite document image is a legally executed release document.

Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

FIG. 8 is a schematic diagram of an exemplary computer graphical user interface for obtaining consent of an applicant to a background investigation and consent to the use of the invention to execute necessary documents with an electronic signature and a signature analogue.

DETAILED DESCRIPTION OF THE INVENTION

In an exemplary form, the present invention is realized in a signature capture and storage technology with document management technology over a network, e.g., the Internet. This system allows documents to be completed, reviewed, and signed using, for example, only an Internet enabled device (e.g., a personal computer, a laptop computer, a PDA, and an Internet-enabled wireless telephone) and a Web browser application. The technology can be used any place in the world with a connection to the Internet or within any internal or other network. The documents can be signed using a mouse, a stylus, a touch screen, a touch pad, a graphics tablet, or other suitable input device to draw a signature analogue on the screen similar to signing a paper document with a pen. A fingerprint image, retinal scan image, or other similar biometric input may be captured in addition to or in lieu of a signature analogue. The signature analogue is then linked to the appropriate documents.

In one embodiment, the present invention may be viewed as a method or process for acquiring a signature analogue and executing a document for submission to an information provider. Generally, the method may be understood most readily in the context of an application process wherein an applicant is requested to complete and sign one or more forms for further action by another party. Exemplary application processes may include, for example, employment applications and loan applications. However, the invention should not be viewed as limited to any particular application process as it is applicable whenever there is a requirement for an actual, handwritten, pen-and-ink-like signature on one or more documents.

It is anticipated that a method according to the present invention would normally be executed over a distributed network, for example, the Internet, with information input and processing performed by one or more computers connected with the network. The method would normally involve the use of standard electronic mail (e-mail) and World-Wide-Web (hereinafter "Web") browsing systems and applications. However, the method could also be implemented using, for example, a local area network (LAN), a wide area network (WAN), a private network, a wireless network, a telephone network, a cable network, or any similar network capable of connection with a communication device that provides data input and transfer capabilities. Exemplary communication devices may include, for example, personal computers, dummy terminals, Web- or data-enabled (e.g., e-mail) PDAs, and Web- or data-enabled (e.g., e-mail) wireless telephones.

Figure 1:
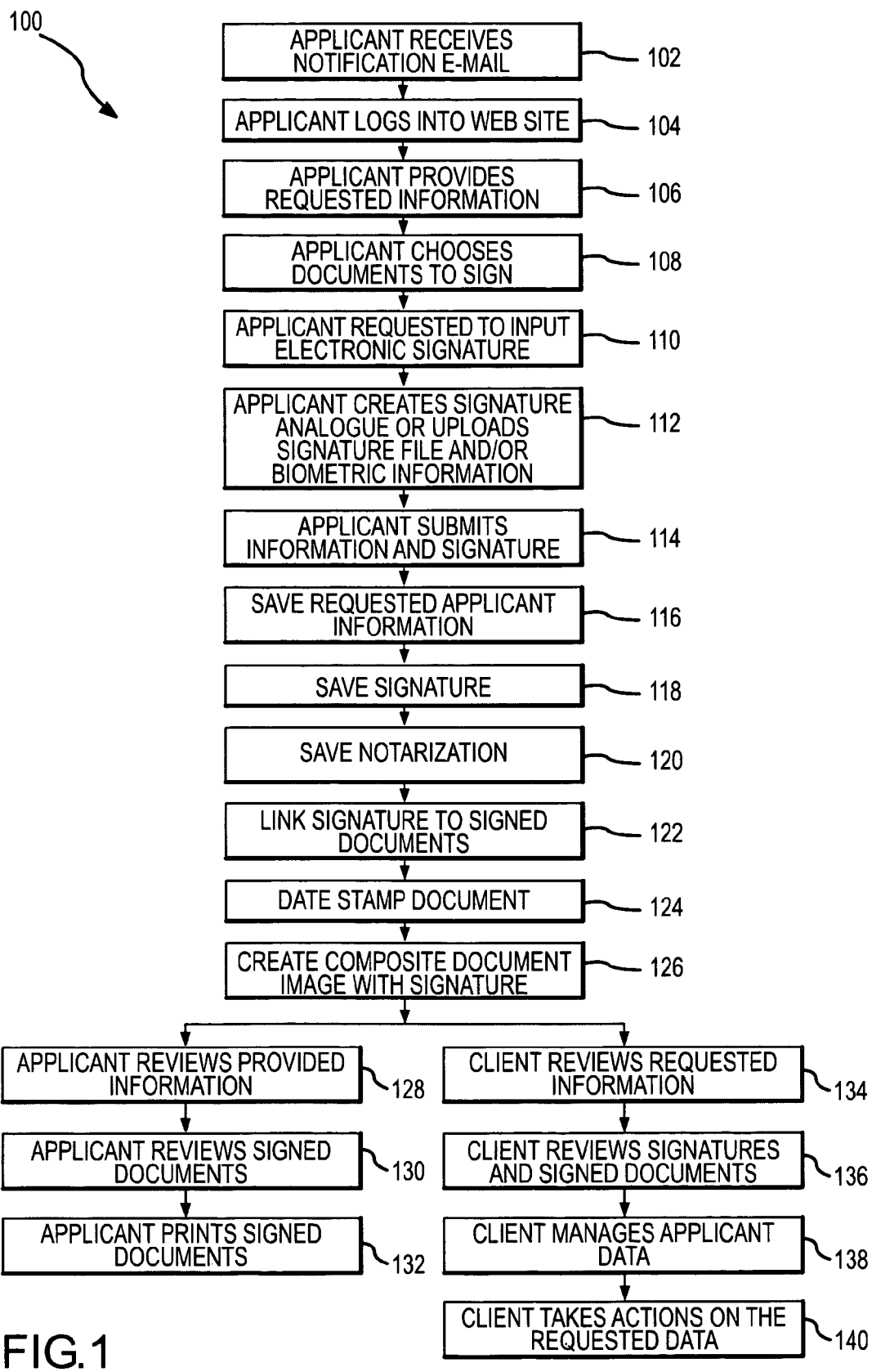
FIG. 1 is a schematic flow diagram of a process of acquiring a signature analogue and executing an associated document according to one embodiment of the invention.

At a high level, the method may consist of a series of steps or actions as depicted in FIG. 1. The process begins in step 102 wherein an applicant receives notification, for example, via e-mail, requesting that the applicant provide additional information to complete an application for further processing. In step 104, the applicant would use a personal computer or other communication device to access the network, e.g., by logging into a Web site over the Internet. The e-mail notification in step 102 may provide the applicant with a secure password and a uniform resource locator (URL) hyperlink to access the appropriate Web site. In step 106, the applicant inputs requested application information into a form provided by the Web site.

In addition, the Web site presents a listing of documents that require the signature of the applicant in order to complete the application process. In step 108, the applicant selects the documents that the applicant agrees to execute. The applicant is then prompted to type an electronic signature in step 110. A legally compliant electronic signature, as discussed previously, consists merely of some indication by the signatory that he intends the indication to be associated with a particular document and to act as a binding and legal signature. For example, the applicant may merely type his name between two forward slashes (e.g., /John Doe/) to indicate that this input of his name is intended to be an electronic signature.

In addition to the electronic signature request in step 110, the applicant is requested to create an analogue to a handwritten, pen-and-ink signature as indicated in step 112. The signature analogue may be captured for transmission over the network by one of several methods. For example, the applicant could use a computer mouse to draw an analogue to a handwritten, pen-and-ink signature on a computer. Similarly, an applicant could write his signature using an electronic stylus on a PDA, a stylus tablet or graphics tablet connected to a personal computer, or a touch screen computer monitor. Alternately, the applicant may upload an image file of his signature previously created, for example, an image file containing a scanned image of a pen-and-ink signature on a piece of paper.

Figure 2:
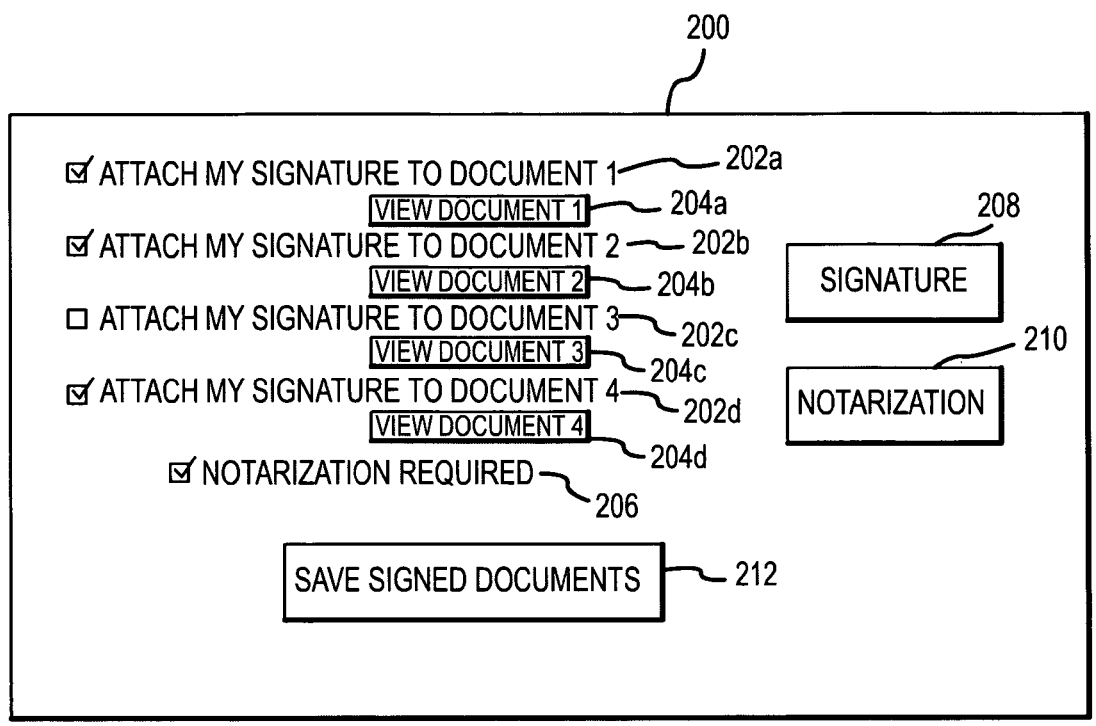
FIG. 2 is a schematic diagram of an exemplary computer graphical user interface for selecting documents for review and signature application.
Figure 3:
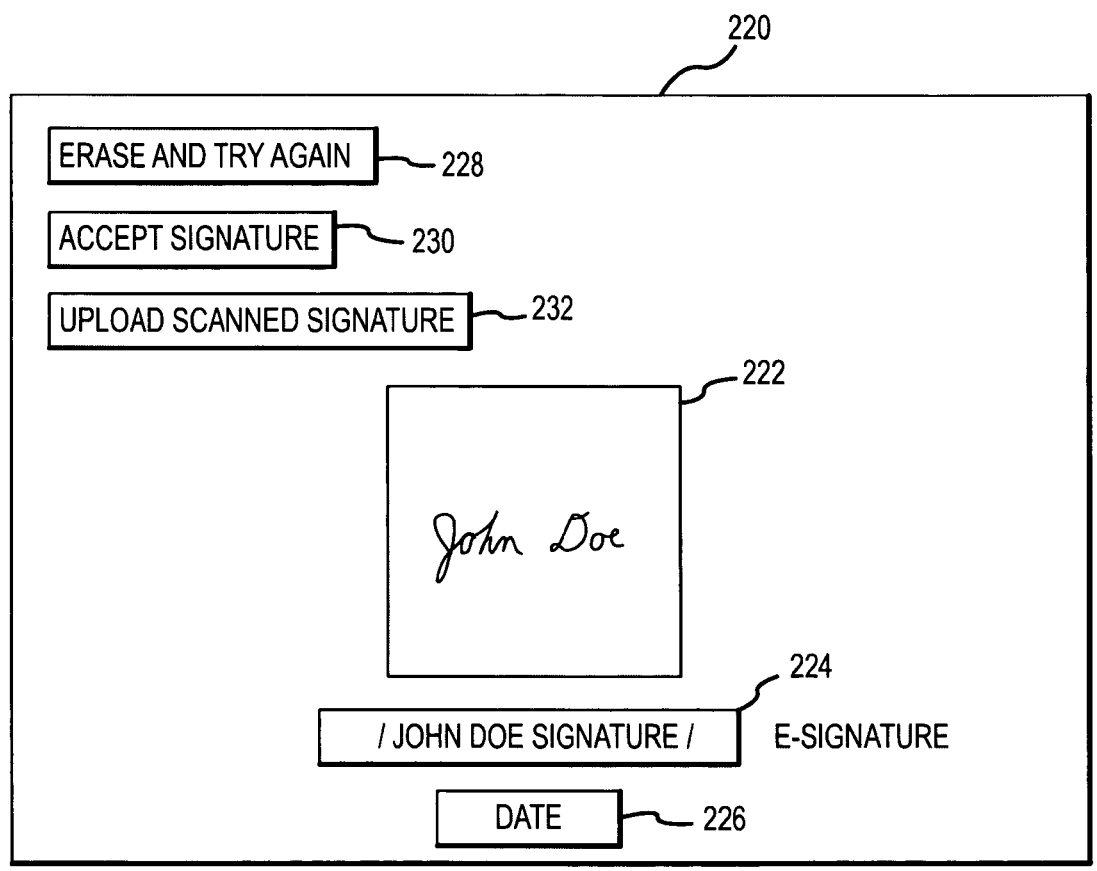
FIG. 3 is a schematic diagram of an exemplary computer graphical user interface for inputting a signature analogue and an electronic signature.

Steps 108, 110, and 112 of the process as depicted in FIG. 1 may be better understood in view of FIGS. 2 and 3. FIG. 2 is a representation of an interface, for example, a screen shot of a Web page distributed by a Web server managing the application input interface to an applicant for solicitation of his signature for placement on various documents for execution. The input screen 200 presents a series of four documents that an applicant may be required to sign in order to complete the application process. The applicant can select which documents he wants to sign. These are indicated by the completion of the check-boxes adjacent to the listing of Document 1 202a, Document 2 202b, and Document 4 202d. In this exemplary interface, the applicant has chosen not to execute Document 3 202c as indicated by the empty check-box adjacent thereto. The screen interface 200 also provides the applicant the opportunity to view and review each of the documents that he is requested to sign. By selecting any of the "view document" buttons 204a, 204b, 204c, and 204d, a new screen would be instantiated by the Web server to present the text of the selected document that the applicant is requested to sign. In some instances, a document may require notarization of the applicant's signature. The notarization line 206 underneath Document 4 202D indicates that notarization of Document 4 is required. In order to attach a signature analogue to the selected documents, the applicant selects the signature button 208. In order to notarize his signature for any document requiring notarization, the applicant may select a notarization button 210. Once all desired documents have been signed and/or notarized, the applicant may select the "save signed documents" button 212 in order to save his signature and associate his signature analogue with the indicated documents.

Upon selection of the signature button 208 in FIG. 3, a new input screen 220 providing a signature input interface is instantiated, as depicted in FIG. 3. The applicant is provided the opportunity to sign his name in the signature box 222 using, for example, a computer mouse or other computer input device capable of allowing the applicant to create a signature analogue on the computer screen. Understanding that the use of a mouse to create a signature is somewhat unorthodox, the method provides an opportunity for an applicant to practice his signature in the signature box 222 multiple times before approving a particular signature analogue for use in signing a document. As shown in the input screen 220, an erase button 228 is provided, which erases any signature attempt in the signature box 222 and allows the applicant to sign his name any number of times until an acceptable signature analogue is created.

As an alternative to creating a signature analogue in the signature box 222, the applicant may upload an image file containing, for example, a scanned image of the applicant's signature by selecting the upload button 232. The upload button will open a standard file manager interface of the computer operating system to allow the applicant to select the image file of his analogue signature for uploading over the network. As noted, in some situations it may be desirable to additionally or alternatively collect biometric authentication data from the applicant. Generally, this will require the use of a specialized biometric input device at the location of the applicant, for example, a fingerprint scanner, a retinal scanner, or a photographic/video feature scanner (usually of the face). Files generated by these scans can similarly be uploaded over the network for attachment to a document as authentication. Previously generated biometric files may also be uploaded transmitted over the network, similar to the provision of a signature image file. One current, common use for biometric information is for the collection of a fingerprint to conduct a background investigation of an applicant's criminal history.

The applicant is also requested to enter an electronic signature 224, for example, by typing the applicant's name between two forward slashes in an input box. The date of execution of the documents is provided in the date box 226. The date may be auto-generated as part of the process and/or may be input directly by the applicant. Once the applicant has input his signature analogue in the signature box 222 and an electronic signature in the e-signature box 224, the applicant may select the accept signature button 230 in order to store both of his signatures.

Figure 4:
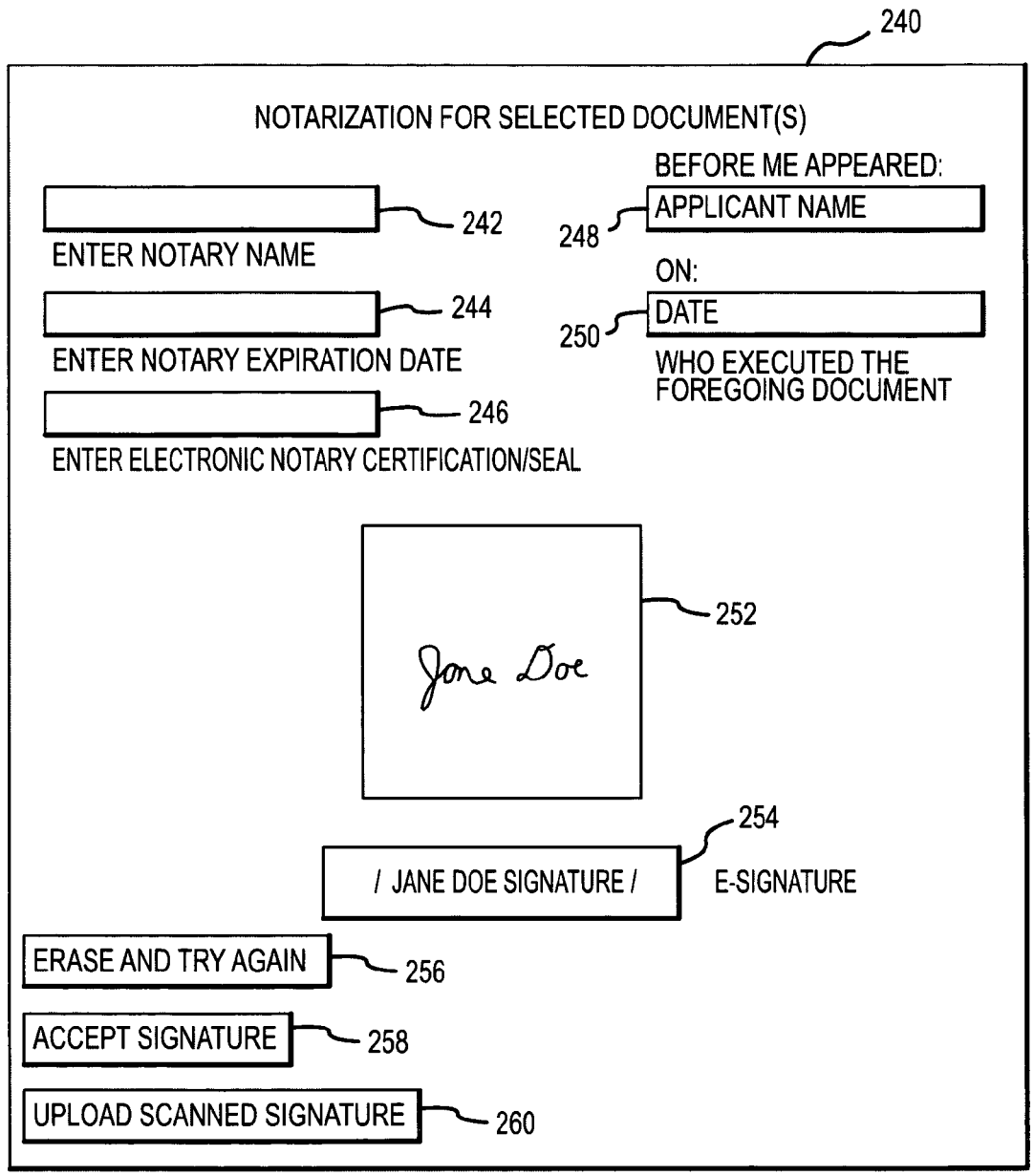
FIG. 4 is a schematic diagram of an exemplary computer graphical user interface for inputting a notary signature analogue, an electronic notary signature, and notary certification identification.

As indicated in FIG. 2, some documents may additionally require a notarization of the signature as indicated by the notarization notice 206 following a document listing. By selecting the notarization button 210, an applicant may be presented with a notarization interface 240 distributed by the Web server as depicted in FIG. 4. Similar to the signature input interface 220, the input of notarization information in the notarization interface 240 will allow the notarization to be applied to all of the documents selected by the applicant on the document selection screen 200 that additionally require notarization. In order to apply notarization to a document, a notary is generally physically present with the applicant using the same network interface device that the applicant uses to input his signature on the signature input screen 220. Actual physical presence of an electronic notary is generally required by most state electronic notarization statutes. On the notarization input interface 240 the notary is requested to enter her name 242, enter her notary expiration date 244, and enter an electronic notary certification or seal 246. The electronic notary certification is typically a unique numeric or alphanumeric string issued by the state notary certification authority to each registered electronic notary in order to authenticate the notarization in lieu of a seal on physical paper. The applicant name 248 and the date of notarization 250 may automatically be inserted into the notarization interface 240 as part of a standard notarization attestation, for example, "before me appeared [applicant name] on [date] who executed the foregoing document."

The notary is then requested to input a pen-and-ink signature analogue in a signature capture box 252, as well as provide an electronic signature in an electronic signature input box 254. As with the applicant's signature interface, the notary is allowed to practice inputting a signature analogue in the signature capture box 252 as many times as desired by selecting the erase and try and again button 256. Once the notary has created an acceptable signature analogue in the signature capture box 252, she may select the accept signature button 258 and both the signature analogue in the signature capture box 252 and the electronic signature 254 will be saved over the network. As an alternative to attempting to create a signature analogue in the signature capture box 252 via a mouse or other input device, the notary may opt to upload an image file with a previously saved, scanned image of a pen-and-ink signature on paper by selecting the upload scanned signature button 260. By selecting the upload scanned signature button 260, a standard file management interface will be generated to allow the notary to select the image file of her signature, for example, a JPEG image, and upload the signature image file over the network.

Returning now to FIG. 1, once the applicant has created a signature, as identified in step 112, the applicant then submits the application including his signature and other input information as indicated in step 114. The requested applicant information (step 116), the applicant's signature analogue (step 118), and any required notarization signature analogue and information (step 120) are each saved for later use. The saved signature, and any notarization, are linked to the particular documents selected by the applicant for execution as indicated in step 122. Additionally, each of the documents selected for execution by the applicant are date stamped in step 124 with the date of execution by the applicant. The Internet protocol address of the applicant's computer may also be captured and stored.

Next, a composite document image is created with the applicant's signature analogue, date of execution, and any notarization that may be required as indicated in step 126. The composite executed document image may be created and stored as a composite image and associated permanently with the applicant's record. Alternatively, a composite executed document image may be created dynamically on each occasion an executed document is requested or desired for presentation or output. In this alternative methodology, a composite executed document image is never saved permanently, but instead the links between an applicant's signature analogue, the selected document forms, and the execution date stamp are maintained for dynamic creation of an executed document image whenever required. With either methodology, a composite document image, the applicant's signature, the date of execution, and any notarization are all associated permanently with the applicant's record.

Once the applicant information and signature have been stored, the applicant may be provided the opportunity to review the information entered as indicated in step 128. The applicant may also review the signed documents (step 130). Upon such a review request by an applicant, the applicant may be presented with a composite executed document image showing the applicant's signature appropriately inserted into the signature line of a particular document, as well as the execution date recorded by the date stamp affixed to a date line of the document. The applicant may also be afforded the opportunity to print the composite executed document image (step 132) for his own personal records. The applicant may also save a copy of the composite executed document image, for example, as an image file, for his own personal records.

Figure 5:
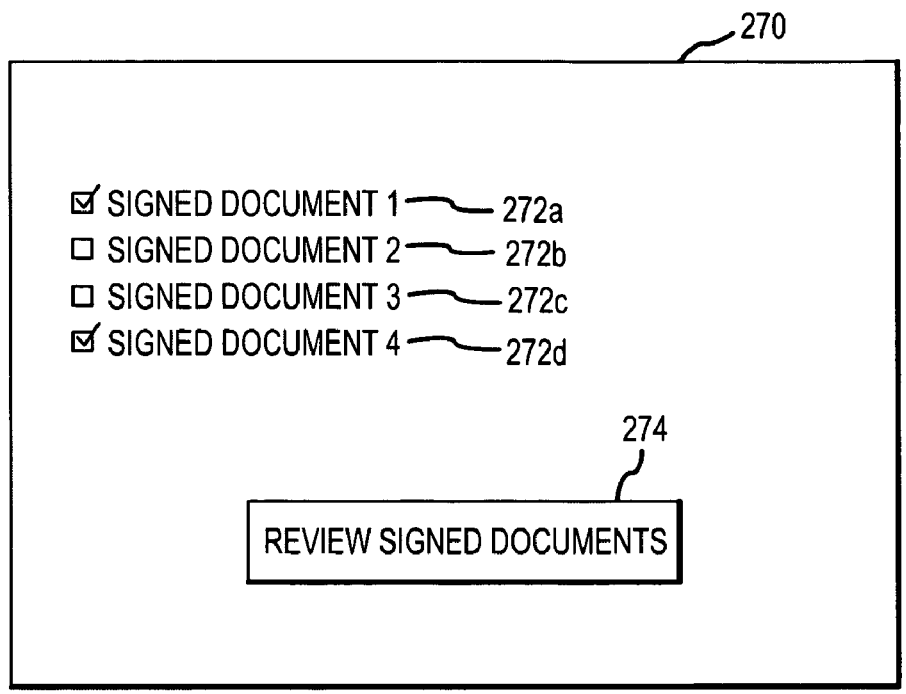
FIG. 5 is a schematic diagram of an exemplary computer graphical user interface for selecting executed documents for review.
Figure 6:
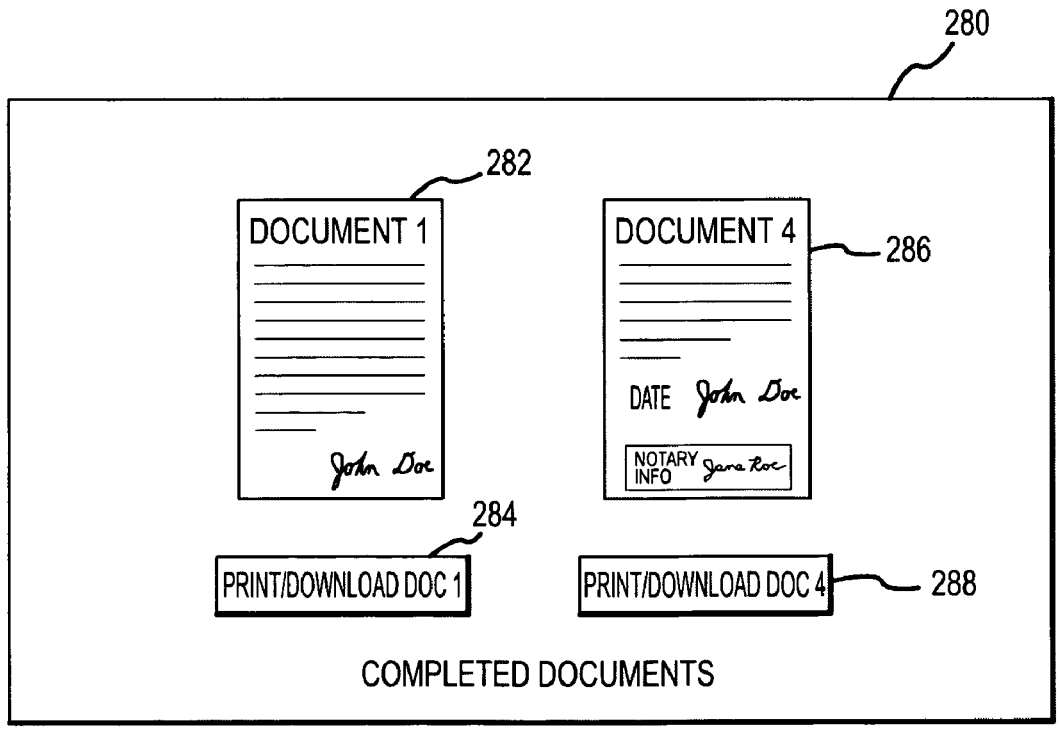
FIG. 6 is a schematic diagram of an exemplary computer graphical user interface for reviewing and outputting selected executed documents.

FIGS. 5 and 6 depict graphical user interfaces of an exemplary embodiment of the process 100 operating on a computer network and corresponding to steps 128, 130 and 132 of FIG. 1. FIG. 5 depicts an input interface 270 that allows a user to select and review one or more signed documents executed during the application process. The interface 270 depicts a listing of documents 272*a*, 272*b*, 272*c*, and 272*d* executed by a particular applicant during an application process. The user desiring to review these documents may select any or all documents for review. In the example of FIG. 5, Document 1 272*a* and Document 4 272*d* are selected for review. In order to review the executed documents, a review signed documents button 274 may be selected. By selecting the review signed documents button 274, a new interface 280 may be instantiated depicting an executed document image 282 of Document 1 and a second executed document image 286 depicting Document 4. The applicant's signature and the execution date appear at the bottom of Document 1. Document 4 required notarization. Thus, the applicant's signature, the execution date, and a notarization block appear on the bottom of Document 4. If the user desires his own copy of Document 1, the user may select the corresponding print/download button 284 to print a paper copy of Document 1 or download an image file of Document 1. Similarly, should a user desire a copy of Document 4, the user may select the corresponding print/download button 288 to print a copy of or save an image file of Document 4.

Returning to FIG. 1, once an applicant has completed the application information and provided a signature for execution of appropriate documents, a client requesting the information of the applicant may similarly review the applicant information (step 134). The client may also review the applicant's signature analogue and the executed document images of the signed documents (step 136). The client may also be provided tools to manage applicant data (step 138), for example, applicant name, address, e-mail address, and position applied for. In one embodiment, the client may select documents from multiple applicants for review. The client may then take any appropriate action based upon its review of the requested data (step 140). For example, the client may be a bank and the executed documents may comprise a loan application. The bank may then review the documents and applicant information in order to approve or deny the loan. In another example, the client may be a leasing agent and the applicant may be applying to rent an apartment. The leasing agent may then review the executed documents to determine whether or not to lease the apartment to the applicant.

Figure 7:
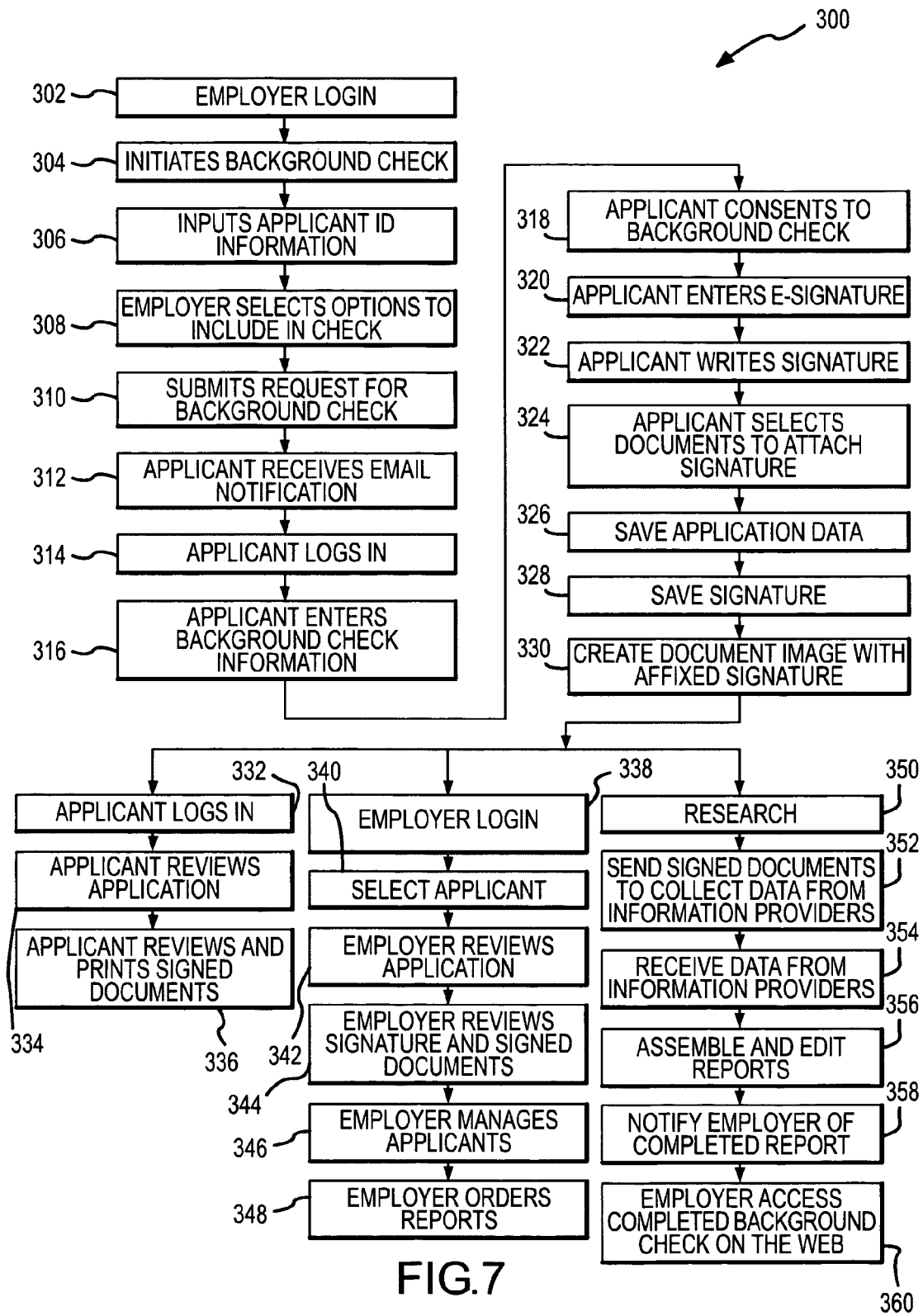
FIG. 7 is a schematic flow diagram of a process of acquiring a signature analogue for use in executing background investigation release documents according to another embodiment of the invention.

FIG. 7 depicts an exemplary signature management process 300 according to another embodiment of the invention with specific application to the background investigation industry. This process may be initiated by a client employer accessing a release form management system (step 302) maintained by a research agency to secure an applicant's signature on release forms that allow the research agency to conduct the background investigation. The employer may access the system through the employer's computer, for example, via the Internet through a Web server maintained by the research agency to interface with the release form management system. In order to initiate a new background check (step 304), the employer inputs applicant identification information (step 306) into the system. Such applicant information may include, for example, the applicant's name, address, phone number, social security number, employment position, and e-mail address.

The employer may also select from various services to be included in the background check (step 308). These services may be in addition to any set of standard services that the client has previously identified as required for a standard background check. For example, an employer may regularly only require employment verification checks. However, the particular position may require the prospective employee to operate a company vehicle. Therefore, the employer may select an additional motor vehicle record search request. Once the employer has selected any desired services to include in the background investigation, the employer submits the request for the background check (step 310) to the release form management system. By submitting a request for a background check, the system will generate an e-mail notification to the applicant requesting that the applicant provide necessary information to the research agency for completing the background investigation. If desired, an employer can customize the e-mail message or simply send a generic e-mail notification message to the applicant.

When the applicant receives the e-mail notification at his computer or other communication device (step 312) requesting participation in a background investigation as a prerequisite to employment by the employer, the applicant may access the Web server at the research agency, for example, by selecting a hypertext link embedded within the e-mail message. Selection of the hypertext URL link to the Web server directs the applicant's Web browser to the appropriate Web server. The Web server will transmit a login page to the applicant's computer allowing the applicant to login (step 314) to the release form management system.

The applicant will then be provided an interface through which the applicant will enter necessary information required to conduct the background check (step 316). Such general background information may include, for example, the applicant's legal name, address, phone numbers, and driver's license number. The applicant may also be requested to provide other names used, for example, a maiden name or an alias. The applicant may also be further required to provide previous address information, for example, residential addresses over a period of years. If the applicant previously resided in other states, the applicant may be requested to provide previous driver's license numbers. The applicant may additionally be requested to provide prior employment information including names and addresses of several of his most recent previous employers, positions held, and names and contact information of supervisors or co-workers. The applicant may also be requested to provide professional references with contact information. The applicant may also be requested to provide an education history, for example, identification of high school, college, and post-graduate educational institutions, with addresses and contact information, and an indication of all degrees conferred. The applicant may further be requested to provide professional licensure information, for example, professional engineer, certified financial planner, registered nurse, etc. The applicant may also be requested to provide additional personal information that is necessary to conduct a complete background check according to the services that the potential employer has selected. The system saves applicant data at each step in the data entry process. Once the applicant has entered all the background check information, he may have the opportunity to review the information for accuracy.

Once the applicant is satisfied that the information is accurate, he may be required to authorize the background investigation by executing one or more consent and release forms (step 318). An exemplary consent and release form 290 is depicted in FIG. 8. The consent and release form 290 may have a first disclosure authorization and release section 292 advising the applicant that the research agency will be conducting a background investigation and identifying possible areas of research including employment history, consumer reports, workers compensation history, and motor vehicle records. A second notice section 293 may be provided in order to explain the use and effect of electronic signatures and digital documents and advise the applicant that his execution of the document with an electronic signature is binding. The applicant may input his electronic signature in the signature input box 294. The Internet protocol address of the computer used by the applicant to complete the application may be recorded for confirmation and identification purposes in box 296. The applicant may also be required to affirmatively acknowledge an attestation stating that the applicant understands that both his electronic signature and his pen-and-ink signature analogue on other forms are binding confirmation of the applicant's consent to and authorization of the background investigation. Once the applicant has had an opportunity to review the disclosure and consent information and sign the attestation section, he may save the disclosure and consent form 290 by selecting the save data button 299.

Returning to FIG. 7, after the applicant consents to the background investigation in step 318, the applicant will be asked to enter an electronic signature (step 320) and use an input device to create a pen-and-ink signature analogue (step 322) to be used in the execution of various documents and release forms necessary to conduct the background investigation. An exemplary interface for collecting the electronic signature and a pen-and-ink signature analogue is depicted in FIG. 3 and was previously described herein. Exemplary documents that may need to be executed to conduct a background investigation may include, for example, motor vehicle record requests, credit report authorization forms, workers compensation history authorization forms, and educational record requests. The applicant selects which documents or authorization forms that he intends to execute with his e-signature and pen-and-ink signature analogue (step 324). A process of selecting the release forms or other documents in a Web-based environment is depicted in FIG. 2 and was previously described herein. The applicant's application data is saved (step 326), his electronic signature and pen-and-ink signature analogue are saved (step 328), and all are linked to the documents and release forms which the applicant selected for execution in step 324. A composite document image may then be created (step 330), wherein the applicant's pen-and-ink signature analogue is combined with each of the required documents and release forms to create a signed document with the appearance of an original pen-and-ink signature.

In this exemplary process 300 for the background investigation industry, several different parties may be provided access to the applicant's application and/or the executed documents and forms. For example, an applicant may log back into the system (step 332) at some time after having completed the original background investigation application. The applicant is provided an opportunity to review the contents of the background investigation application (step 334). The applicant is also provided access to the composite document images that include signature analogue created by the applicant. The applicant is further allowed to review, print, or download the fully executed document images (step 336) for his records. Such access fulfills the requirements of current federal statutes regarding electronic signatures.

Alternatively, an employer may login to the system (step 338) at some time after initiating a background investigation. The employer may select one or more applicants (step 340) and be provided access to the background investigation application of any particular selected applicant (step 342). The employer may also review the applicant's pen-and-ink signature analogue and any of the composite document images incorporating the signature analogue (step 344). At this time the employer may also manage any applicants, for example, by inputting new applicant information, initiating new background investigations, or revising the employer's desired selection of information to be researched and included in a background investigation, either in general for all applicants or for a particular applicant (step 346). The employer may also request completed investigation reports for printing or downloading (step 348) for the employer's records.

Additionally, the research agency responsible for conducting the background investigation may login to the system (step 350) to access the applicant information and composite document images. The research agency may download or output, e.g., print, the applicant information and the composite document images to send to information providers as part of a request for information from the information providers (step 352). For example, the background investigation may require the acquisition of an applicant's educational records from a certain private educational institution. The educational institution may require an executed release for the educational records of the applicant. An acceptable release may be a general release form or it may be a form particular to the educational institution. However, the educational institution may not accept electronic signatures on the release form and may require a pen-and-ink signature. In this instance a printed composite image document with the signature analogue of the applicant would meet the requirements of the educational institution.

Once background information concerning an applicant is received from an information provider (step 354), the information may be uploaded or entered into the system by the research agency, the information may be assembled into a report format and made available for quality control editing (step 356). Once the background investigation report is complete, the employer is notified that the report is complete (step 358). The employer can then access the report on the system via the Web for review, printing, or downloading for the employer's files (step 360). Alternatively, the report may be output to the research agency for facsimile transmission or mailing to the employer.

Figure 9:
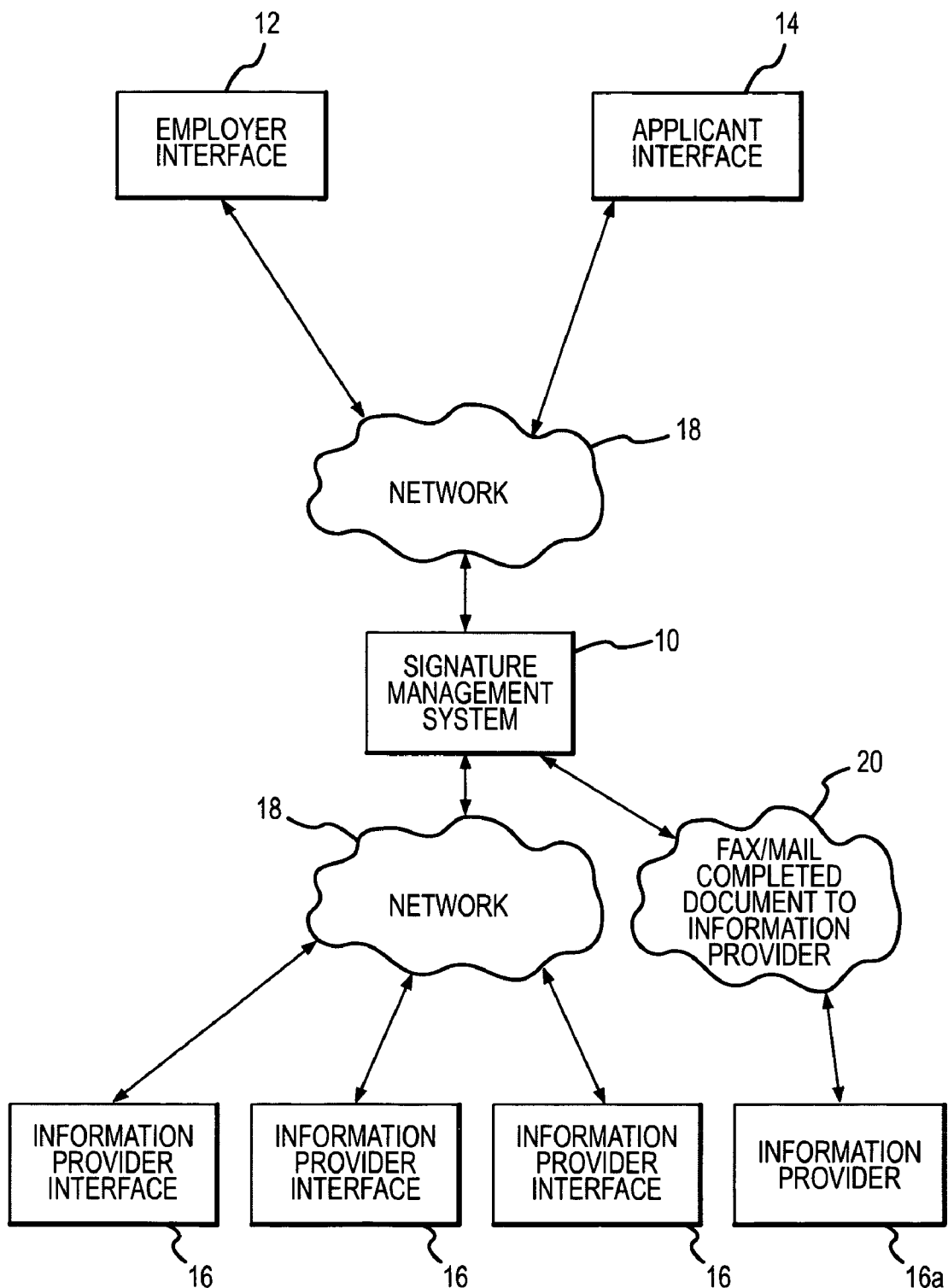
FIG. 9 is a schematic diagram of a signature management system network according to another embodiment of the invention.

FIG. 9 depicts an exemplary system for implementing the collection and application of signature analogues to one or more documents according to the present invention. Again, the system is presented in the exemplary context of a research agency providing employment background investigations. The research agency would generally be the party maintaining the signature management system, although a third party service provider may maintain and provide the system for access and use by all parties to the specific transaction. A signature management system 10, which is described in greater detail below, is connected to an employer interface 12 and to an applicant interface 14 via a network 18. The network 18 may be any type of network capable of providing data transfer communications, for example, a local area network, wide-area network, an intranet, the Internet, a cable system, a telephone system, a wireless network, or a combination of any and all of these networks as they may normally be interconnected. An exemplary system configuration will most likely be the Internet interfacing directly with the employer interface 12 and the applicant interface 14 and perhaps any local area network of which the employer interface 12 and the applicant interface 14 may be a part.

The employer interface 12 may be any system with the ability to transmit and receive data communications over the network. Exemplary systems that can be used as the employer interface 12 may be a personal computer, a laptop computer, a PDA with wired or wireless network features, or a data-enabled wireless telephone. The applicant interface 14 may comprise any one or more of these same system components as just described for the employer interface 12. Generally, the employer interface 12 and the applicant interface 14 will most likely be personal computing systems connected with the Internet and running Web browsing software. However, any Web-enabled communication device may be used as an acceptable interface for communicating with the signature management system 10 of the present invention.

The signature management system 10 is likewise connected with one or more information provider interfaces 16 via the network 18. As with the employer interface 12 and the applicant interface 14, the information provider interface 16 may be composed of a personal computer, a laptop computer, a PDA with wired or wireless networking capabilities, or a network enabled wireless telephone device. Alternatively, the signature management system 10 may communicate with an information provider 16A by generating documents for facsimile transmission or mailing 20 to the information provider 16A.

Figure 10:
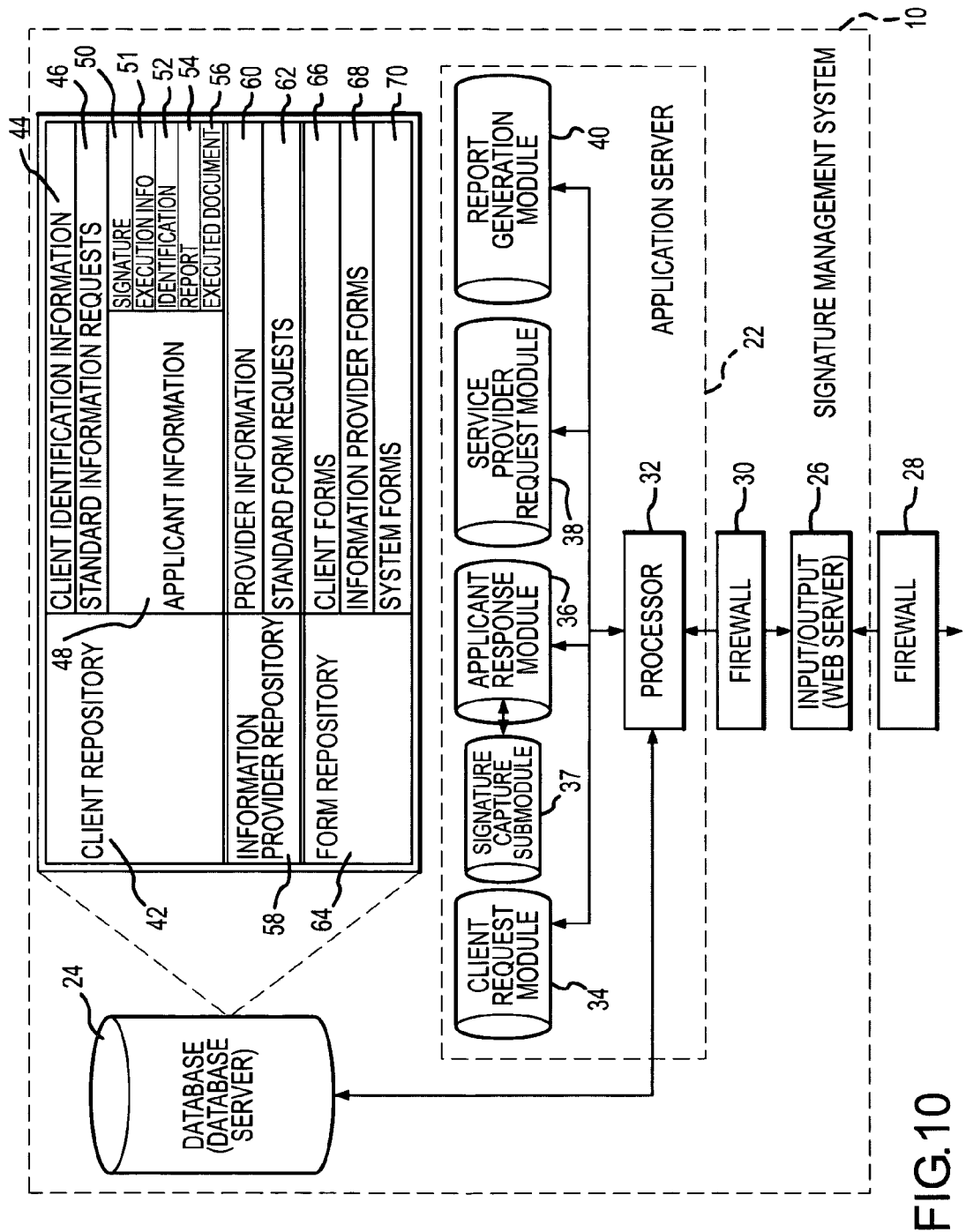
FIG. 10 is a schematic diagram of the components of a signature management system according to an exemplary embodiment of the invention.

This signature management system 10 is depicted in greater detail in FIG. 10. The exemplary signature management system 10 is primarily composed of an application server 22 and a database 24. The database may be part of the application server 22 or alternatively, may be separate database server 24 connected with the application server 22 as indicated in FIG. 10. The signature management system 10 may also include a separate Web server 26 to interface with and handle the input and output traffic between the signature management system 10 and the network 18. Alternatively, the input/output functions of the Web server 26 could be handled directly by the application server 22. It may be desirable for network security purposes to place a first firewall 28 between the Web server 26 and the network 18 and similarly place a second firewall 30 between the Web server 26 and the application server 22. The first firewall 28 may be a separate piece of hardware designed to provide such network security functionality, for example, a router. Alternatively, the first firewall 28 may be a software application running on the Web server 26. Similarly, the second firewall 30 may be a separate piece of security hardware, for example, a separate router, but may likewise also be a software program running on the application server 22. The firewalls 28, 30 may be provided to insure the integrity of the data and functionality of the signature management system 10.

In an exemplary system, the Web interface may be written in ASP.NET using VB.NET, Javascript®, HTML and Flash®. The Web interface may be hosted on IIS Web servers running Microsoft® Windows 2000® and the Microsoft® .NET® framework. The back-end database may be implemented using Microsoft SQL® Server on Windows NT®. The set of hardware, software, programs and programming languages that make up the system are not necessarily unique in the solution of this problem. The signature capture abilities of the system may include a Java® applet for signature collection in addition to Flash® implementation.

The application server 22 may comprise primarily a processor 32 that runs a plurality of software programs that direct the collection, storage, and manipulation of data according to the present invention. In the exemplary embodiment depicted in FIG. 10, the primary functional components of the software are depicted as four separate modules: a client request module 34, an applicant response module 36, a service provider request module 38, and a report generation module 40. Additionally, the applicant response module 37 may be viewed as comprising a signature capture submodule 37. The functionality of each of these modules will be described in greater detail herein with respect to FIGS. 11-15. In practice, there may be greater or fewer software modules or submodules utilized for implementation of the invention. The description of any software modules herein is only for convenience in describing the major functional elements of the invention and may not be the actual form used for any particular instantiation of the invention. The processor 32 and the application server 22 also interface with the database server 24 to pass information to and collect information from database server 24 at the direction of the software modules 34, 36, 37, 38, and 40.

The database 24 may be characterized as comprising several different sections for storing data according to a primary classification. In an exemplary embodiment, these sections may be identified as a client repository 42, an information provider repository 58, and a form repository 64. The client repository 42 may store certain types of information specifically related to the client, for example, client identification information 44, standard information requests 46, and applicant information 48. The client information may comprise, for example, an address, telephone number, e-mail address, and tax identification number for the client. The standard information requests section 46 may include, for example, a listing of categories of information about an applicant required by the client and identification of or links to documents for execution by an applicant desired by the client.

The applicant information section 48 may include data and information specific to a particular applicant. Exemplary types of data maintained in the applicant information section 48 may include a captured signature analogue 50; execution information 51 concerning the applicant's electronic execution of documents, for example, the date and time of execution, the IP address of the applicant's processor, the contents of the screen where the applicant applied his signature to multiple documents (FIG. 2) and the contents of the documents that were electronically executed; identification information 52, for example, address, telephone number, e-mail address, and social security number; a report 54 compiling the applicant information 48 for use by the client; and one or more executed document images 56, which are composed of any release forms required to perform a background investigation or any other documents requested by the client for execution combined with the captured signature analogue 50 which is affixed thereto.

The information provider repository may include, for example, provider information 60 and standard form requests 62. The provider information 60 may comprise address, telephone number, e-mail address, and tax identification number information for a specific information provider. The standard form request section 62 may contain a list of documents, e.g., release forms, required by the information provider to produce the information desired by the client and requested by the signature management system 10.

The form repository 64 may be viewed as containing information categorized into several different sections. These sections may include a client form section 66, an information provider form section 68, and a system forms section 70. The client form section 66 may be a repository of all of the forms or documents requested or required by clients to be executed by applicants. Each of the client forms in the client form section 66 of the form repository 64 may be linked to a corresponding listing of the form or document saved in the standard information request section 46 of the client repository 42. Similarly, the information provider form section 68 contains the actual forms and documents that the information providers require in order to release requested information. Each of the information provider forms 68 may be linked to a corresponding standard form request listing 62 in the information provider directory 58. Finally, the form repository 64 may contain system forms 70 that are developed for use by the signature management system 10 to collect the required information to effectively process an applicant. Such forms may include, for example, forms for the input and intake of client information, applicant information, and information provider information.

Figure 11A:
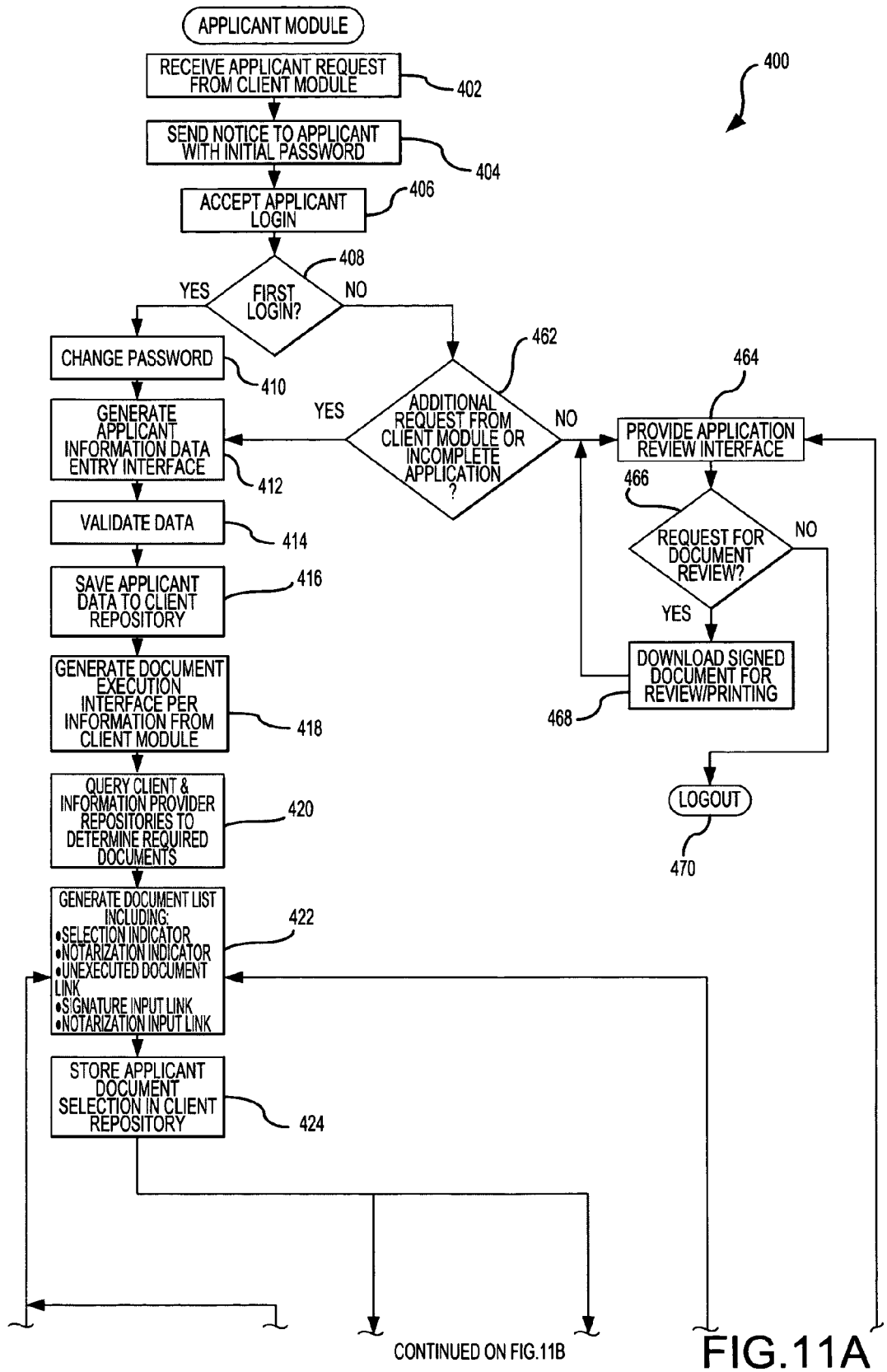
FIGS. 11A and 11B are together a schematic flow diagram detailing an exemplary process performed by the applicant response module of FIG. 10.
Figure 11B:
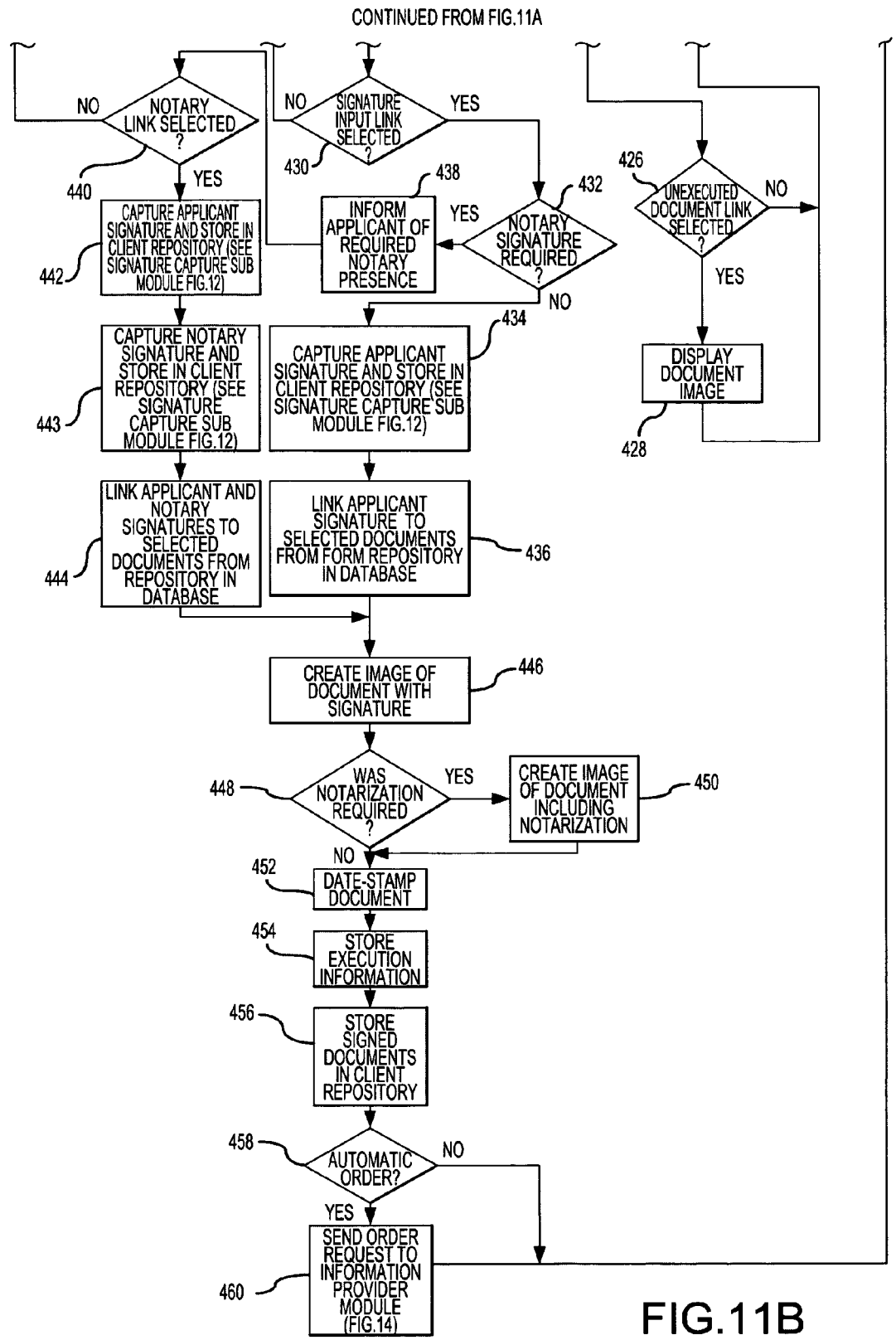

FIGS. 11A-11B depict a flow diagram of an exemplary software process 400 of the applicant response module 36 of the signature management system 10 (see FIG. 10). The process 400 of the applicant response module 36 may instantiate upon receipt of a request from the client request module 34 for initiation of a new applicant background investigation (step 402). The applicant module process 400 then generates an e-mail notice to send to the applicant (step 404) at an e-mail address provided in the information received from the client request module 34. The e-mail notice may be provided with a randomly generated password that is then associated with that particular applicant and which may be used by the applicant to securely log into the signature management system 10. Upon the establishment of a connection between the applicant's computing device and the Web server 26 of the signature management system 10, the applicant module process 400 compares login information entered by the applicant over the Web interface with the name and password information for that particular applicant stored in the database (step 406).

Assuming the applicant enters the appropriate identification and password information, the database is queried as to whether this is the applicant's first login into the system (step 408). If it is the applicant's first login, the applicant may be prompted to change his password if so desired (step 410). Once the applicant has completed the password change, the applicant module process 400 will generate an information data entry interface designed to collect the applicant input information necessary to conduct an appropriate background investigation (step 412). Information input by the applicant is then validated by the system (step 414) to ensure that all required input fields have values and that the applicant's primary personal information matches the information provided by the employer when requesting the background investigation. Once this information is validated, the system saves the applicant data to the client repository (step 416) in fields specifically linked to that particular applicant.

The applicant module process 400 next generates a document execution interface (step 418) wherein appropriate documents for execution by the particular applicant are selected dynamically based upon information identified by the request of the client module 34. This interface may appear, for example, similar to the interface of FIG. 2. The document generation is dynamic in that different documents are selected for execution for different applicants based upon particular criteria. For example, a particular employer may require a motor vehicle history report whereas other employers may not. In addition, based upon the client's present and former addresses, different release forms for requesting motor vehicle reports may be required based upon a particular jurisdiction in which the applicant lived.

In order to provide the appropriate documents for a particular applicant, the process 400 of the applicant request module 36 queries the client repository 42 in the database 24 (step 420) to determine the appropriate documents required by the particular employer and any documents that may be required based on applicant's specific information. The process 400 of the applicant request module 36 further queries the information provider repository 58 to determine the appropriate documents required by information providers. The applicant module process 400 then generates a document list for presentation to the applicant for execution (step 422). When generating the document list, the system may provide the ability for the applicant to select a particular document for execution and for notarization as depicted in FIG. 2 and previously described herein. In addition to generating a document selection list, the applicant module process 400 provides the applicant the opportunity to view, execute, and notarize particular documents. When the applicant selects particular documents to execute, for example, by selecting a check box next to the document title in the browser window interface, the selections are stored in the database and are associated with the applicant (step 424).

As indicated in step 420, a hyperlink may be provided in the browser interface to allow the applicant to view an unexecuted document image. This allows an applicant to review the terms and contents of a document before executing it. If the link is selected by an applicant (step 426), the document image is displayed for review and potentially for printing depending on the configuration of the system (step 428). Once the applicant concludes his review of a document image, the process 400 returns the browser interface to the document selection list of step 422.

Additionally, an applicant may select a link to input a signature analogue to be applied to each of the selected documents in order to legally execute each of those documents. If the signature input link is selected (step 430), the applicant module process 400 first queries whether notarization of the applicant's signature for any of the selected documents is required (step 432). If no notarization is required, a new interface is presented to the applicant in order to capture the applicant's signature analogue and store the signature analogue in the client repository 42 (step 434). An exemplary interface for capturing an applicant's signature analogue is depicted in FIG. 3 and was previously described herein. An exemplary process for capturing an applicant's signature analogue is depicted herein in FIG. 12 and is described in greater detail below. Once the applicant's signature analogue has been captured, it is linked to the document selected in step 422 (step 436), which is stored in the form repository 64 in the database 24.

If a notarization is required in step 432, the process informs the applicant that the presence of an electronic notary is required in order to witness and authenticate the applicant's execution of the documents (step 438). If the notarization link is not selected in step 440, the process then returns to step 422 to allow the applicant to later select the documents for execution when a notary is present. Alternately, if the notarization link is selected in step 440, indicating that a notary is present and the document can be executed, a first interface is presented to the applicant in order to capture the applicant's signature analogue and store the signature analogue in the client repository 42 (step 442). An exemplary interface for capturing an applicant's signature analogue is depicted in FIG. 3 and was previously described herein. An exemplary process for capturing an applicant's signature analogue is depicted herein in FIG. 12 and is described in greater detail below.

Figure 12:
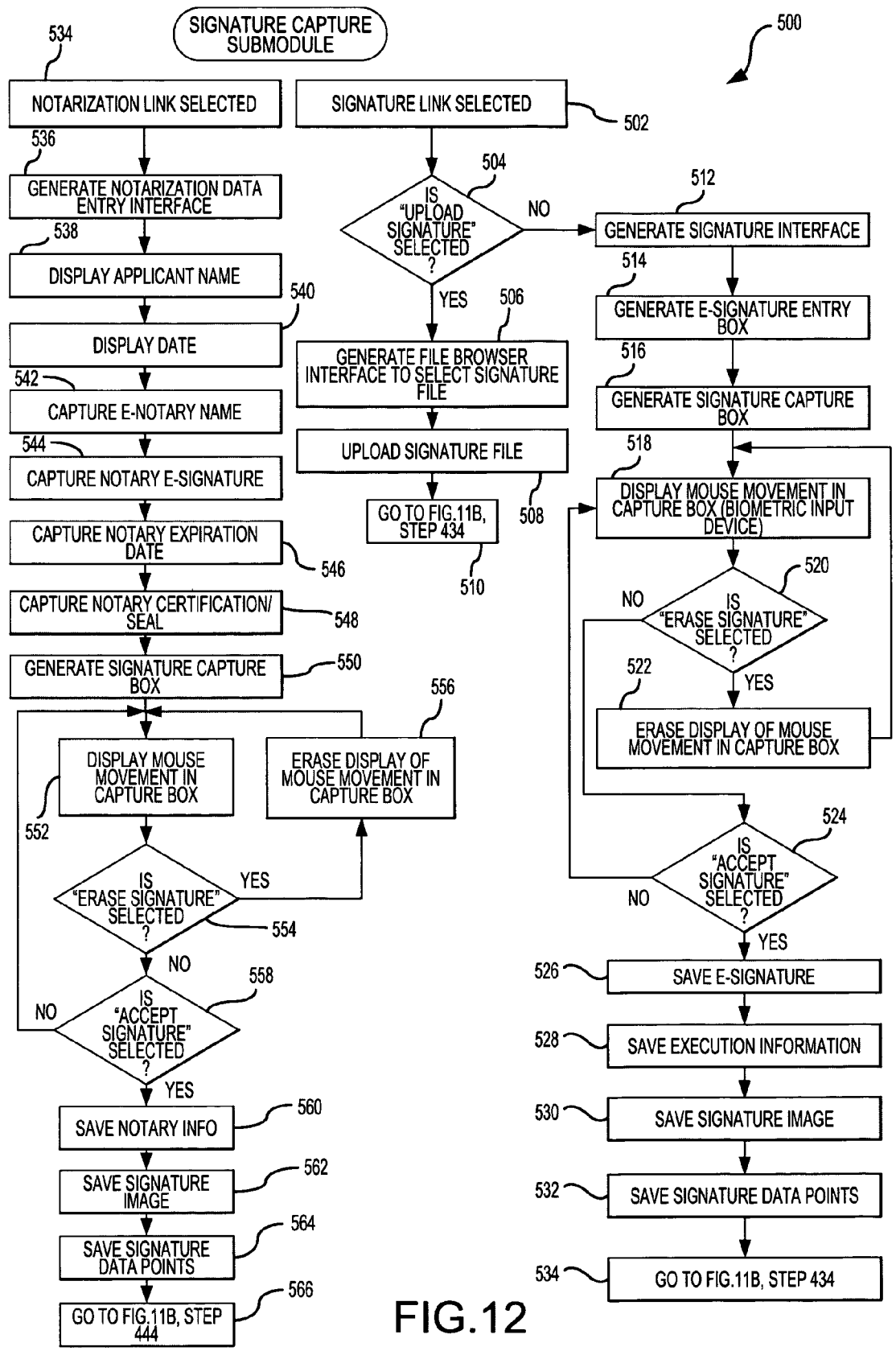
FIG. 12 is a schematic flow diagram detailing an exemplary process performed by a signature capture submodule to the applicant response module of FIGS. 11A and 11B.

The process then generates a notarization capture interface to capture a notary signature analogue and certification or seal (step 443). The process thus allows an applicant's signature analogue to be notarized and the notarization to be affixed to any documents that may require such certification. An exemplary notarization interface is depicted in FIG. 4 and was previously described herein. An exemplary notarization process is depicted in FIG. 12 and is described in greater detail herein below. Once the applicant's signature analogue and the notary information, signature analogue, and certification are captured, the notary's signature analogue is linked to selected documents in a the form repository 64 in the database 24 (step 444).

Once the signature capture process and optionally the notarization steps are complete, the process continues to create composite image documents (step 446). To create the composite image documents, the previously saved signature analogue of the applicant is placed upon and combined with the documents selected for execution to create an executed document with a pen-and-ink signature analogue. With respect to each particular document, the applicant module process 400 then queries whether notarization for that document is required (step 448). If notarization is required, the process creates a combined document image that includes the notary signature analogue and certification (step 450). In addition to affixing the signatures to documents in appropriate places, the documents are also date stamped (step 452) with the date of execution as the date the signature of the applicant was captured and authorized for use by the applicant. The process 400 also stores all execution information presented to the applicant during the execution steps, for example, the contents of the documents that the applicant executed, the date and time of execution, the IP address of the applicant's processor, the language and contents of the screen where the applicant applied his signature to multiple documents, and any other information that may be required to comply with current statutes. The process 400 then stores the signed and dated documents in the client repository 42 associated with the particular applicant (step 456).

Figure 14:
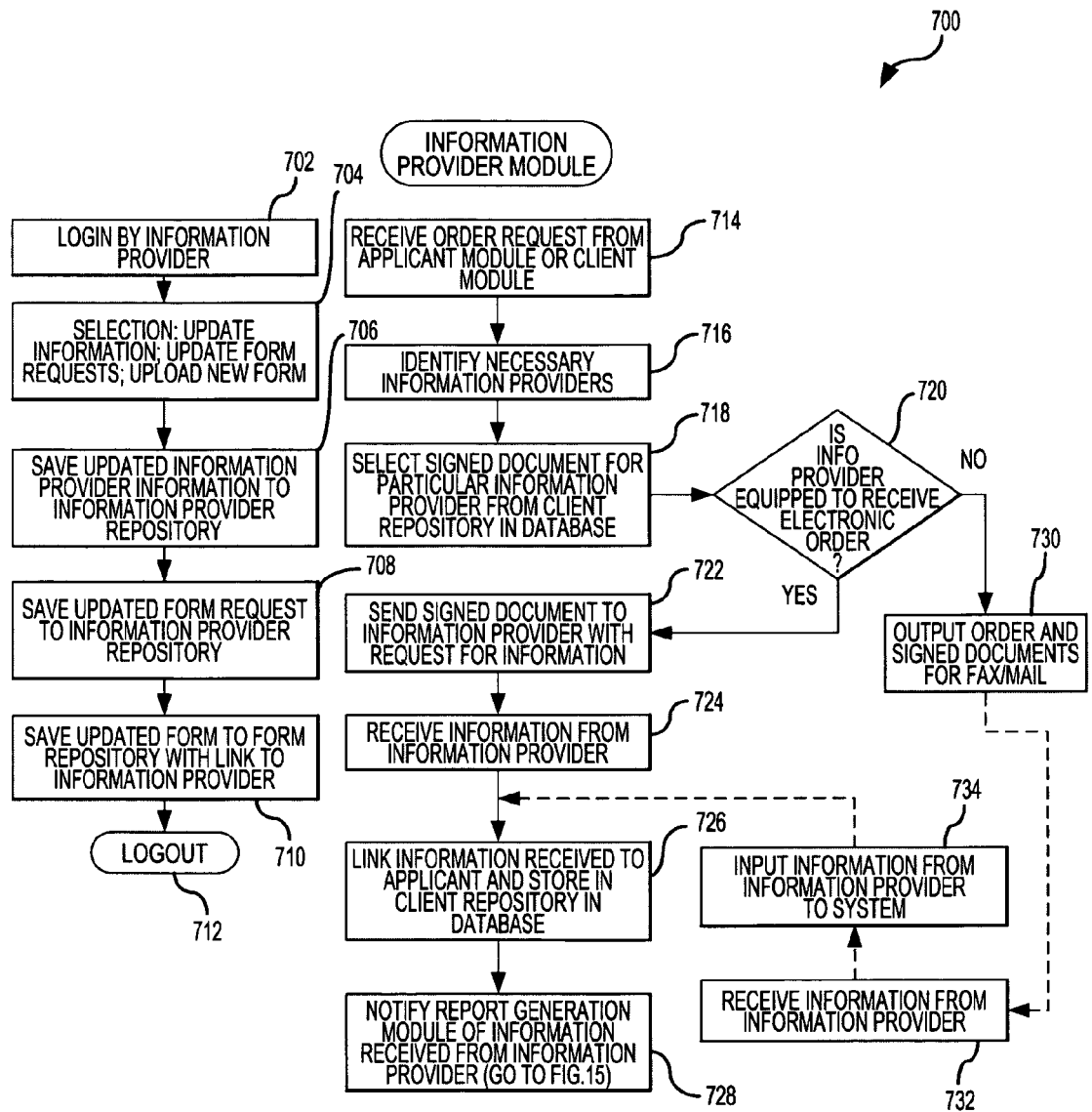
FIG. 14 is a schematic flow diagram detailing an exemplary process performed by the information provider request module of FIG. 10.

The process 400 then queries to determine whether the client has selected to have background investigation reports automatically ordered (step 458) upon completion of an application by the applicant. If so, the process submits an order request to the information provider module (step 460), an exemplary embodiment of which is depicted in FIG. 14. Once the order request is submitted or in the event there is no automatic order, the process then directs the applicant to an application review interface (step 464) further described below.

Returning to step 408 in FIG. 11A, if the applicant module process 400 initially determined that it was not the applicant's first login, the process queries the information request section 46 in the client repository 42 of the database 24 to determine whether the client had input an additional request after the applicant's initial session or whether the applicant's initial application form was saved as incomplete. If either of these situations is true, the process 400 transfers the applicant to the information data entry interface (step 412) in order to input any incomplete application information or execute any additional documents that the client may require. The applicant would be asked to affirmatively opt to allow his signature analogue to be affixed to the additional documents. If the applicant's original application is complete, the applicant module process 400 generates an application review interface (step 464). This interface allows an applicant to review his application or any of the documents he has signed in their fully executed form. An exemplary interface for reviewing such documents is depicted in FIGS. 5 and 6, which were previously described herein. If an applicant does request a document for review (step 466), the process will download the composite document image with the signature analogue appropriately affixed thereto for review or printing by the applicant (step 468). Once the applicant has viewed any desired documents, he may log out of the system (step 470).

As indicated in steps 432 and 442 in FIG. 11B, an exemplary software process 500 of the signature capture submodule 37 is depicted in detail in FIG. 12. The signature capture process 500 captures an applicant's signature analogue and any notarization signature analogue required to fully execute the desired documents. If the signature link is selected (step 502), as is presented in step 432 of FIG. 11B, the process 500 determines which of two potential signature capture methods have been selected by the applicant. If the upload signature file is selected (step 504) by the applicant, the process 500 generates a file browser interface to allow the applicant to select a signature file (step 506). Such a signature file may be a standard image file, for example, a JPEG, GIF, PDF, or TIFF image of a pen-and-ink signature written on paper by the applicant and scanned by the applicant to create the file on his computer system. Once the applicant selects the signature file in the browser interface, the process uploads the signature file (step 508) to the signature management system 10 for use as the applicant's signature to execute selected documents. Once the signature file has been uploaded, the process 500 returns to step 434 in FIG. 11B (step 510).

If the upload signature file option is not selected by the applicant (step 504), a signature entry interface is generated (step 512). This includes the generation of an e-signature entry box (step 514) and a signature capture box (step 516). The signature entry interface may instruct an applicant to write or draw a signature analogue in the signature capture box using standard computer mouse or other computer interface device, for example, a stylus and tablet interface. In order to input a signature, the applicant may hold down a click button on a mouse while moving a mouse on a surface. Movement of a mouse is translated into a line drawing in the capture box in a similar manner to the input of line drawings currently available in most standard drawing software applications (step 518). However, because it is uncommon for an applicant to attempt to sign his name using a mouse, the process allows the opportunity for an applicant to practice inputting a signature analogue until the applicant is satisfied with the way the signature analogue looks.

If the applicant is dissatisfied with a particular signature analogue that is input and displayed in the signature capture box, he may erase the signature and start over. If the erase signature button is selected (step 520), the previous input of the mouse movement in the signature capture box is discarded (step 522) and a blank signature box is presented in which the applicant can again enter a signature analogue (step 518). Once the applicant is satisfied with his signature, he may select an accept signature button (step 524). If the accept signature button is selected, the process will save the last entered signature analogue. Until the accept signature button is selected, any mouse movement will be displayed in the signature capture box.

As indicated in step 514, an e-signature entry box is also generated. Instructions will also direct the applicant to type an e-signature into the e-signature box, for example, by typing the applicant's name between two forward-slashes. Upon the input of a save command by the applicant, the e-signature is saved to the database repository (step 526) and associated with the applicant. The process 500 also stores all execution information presented to the applicant during the execution steps, for example, the contents of the documents that the applicant executed, the date and time of execution, the IP address of the applicant's processor, the contents of the screen where the applicant applied his signature to multiple documents, and any other information that may be required to comply with current statutes (step 528).

Additionally, an image of the signature analogue input into the signature capture box is saved (step 530), for example, as a JPEG, GIF, TIFF, or PDF file. In addition, the process may save data points of coordinate points of the lines and curves (step 532) entered in the signature capture box as the signature analogue. The data points may be used to redraw a point-by-point representation of the applicant's signature exactly as the applicant input it with the mouse. These signature data points may be used to compare or authenticate an applicant's signature should the functionality of the system require such authentication for a particular purpose. Alternatively, signature data points could be used to create an encrypted hash used to certify the authenticity of the documents and the signature if such authenticity is required for a particular purpose. Once the signature capture process is complete, the process returns to step 434 in FIG. 11B (step 534).

When the process 500 recognizes the notarization link is selected in step 440 of FIG. 11B (step 534), the process 500 generates a notarization data entry interface (step 536). The notarization data entry interface may be similar to the interface depicted in FIG. 4 and previously described herein. The notarization data entry interface may display the applicant's name (step 538) and the date (step 540). The notarization data entry interface will also display an input field to record an input of the electronic notary's name (step 542) and an input field to capture an electronic notary signature (step 544). The notary will be directed to enter her name as well as provide any signature, for example, the typed name of the notary positioned between two forward-slashes. In addition to providing a name and an electronic signature, the notary may be required to record the expiration date of her commission and her electronic notary certification or seal identification. The process will capture the input of the notary expiration date (step 546) and the notary certification identification (step 548).

The process additionally generates a signature capture box (step 550) similar to the signature capture box generated for input of the applicant's signature analogue. As with the applicant, the notary will be requested to input a signature analogue using a standard computer mouse or some other input device to draw a signature analogue in the signature capture box. Movement of a mouse while a button on the mouse is depressed will be displayed in the signature box (step 552). As with the applicant, the notary will be allowed an opportunity to practice drawing her signature in the signature capture box. If a notary selects the erase signature button (step 554), any previous mouse movement displayed in the signature capture box will be erased (step 556) and a blank signature capture box will be presented for recordation of new mouse movements to input the signature analogue. Once the notary approves of the signature analogue in the signature capture box, she may select the accept signature button.

If the accept signature button is selected (step 558), the process 500 will save all of the notary information previously entered including the notary's name, e-signature, certification expiration, and certification identification to the client repository in the database 24 and associate this information with the particular applicant (step 560). The signature image generated in the signature capture box is also saved (step 562) as an image file, for example, as a JPEG, GIF, TIFF, or PDF file. Data points along the curve of the notary signature analogue may also be saved (step 564) for redrawing the signature analogue point-by-point on a document, or for later identification comparison or encryption authentication purposes. Once all of the notary information has been saved, the process returns to step 444 in FIG. 11B (step 566).

Figure 13:
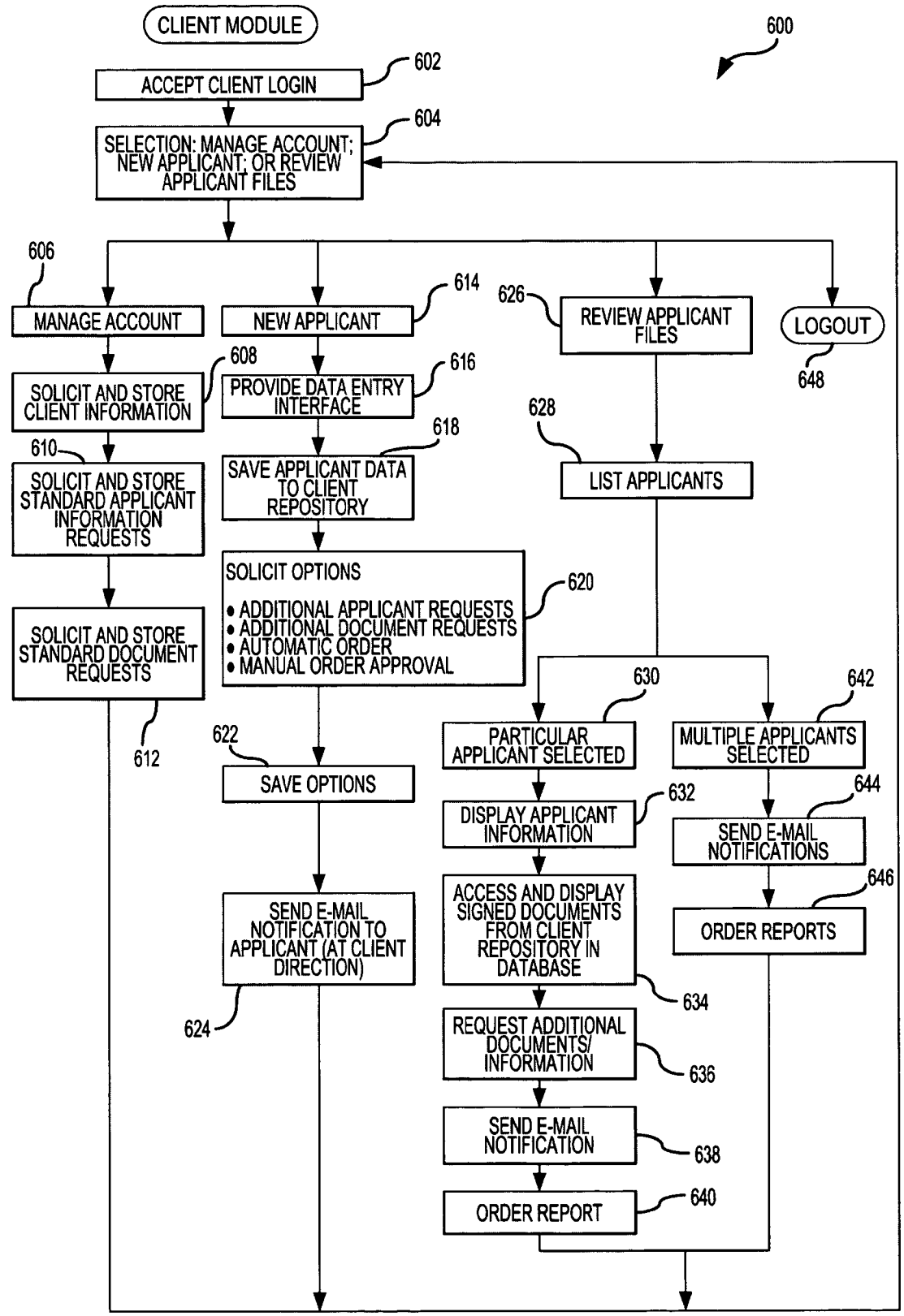
FIG. 13 is a schematic flow diagram detailing an exemplary process performed by the client request module of FIG. 10.

An exemplary process 600 performed by the client request module 34 is depicted in FIG. 13. The processes 600 handled by the client module 34 may begin with the acceptance of a client login (step 602). Once a client has successfully logged in, the process may provide a menu of options for selection by the client (step 604), including account management, new applicant addition, or review of applicant files. If account management (step 606) is selected, the process provides an interface for soliciting and storing client information (step 608). Such information may include, for example, the client's name, address, telephone numbers, e-mail addresses, and primary client contacts.

The account management process may also provide an interface for soliciting and storing standard applicant information requests (step 610). In this step, the client identifies to the system the particular types of information the client desires to acquire from an applicant. For example, if the client is an employer requesting a background investigation of a potential employee, the information requested by the employer may include a listing of a previous employers and a listing of references. Alternatively, if the client is a lending institution, the client may desire to solicit employment and credit information from the applicant. The process may also solicit and store standard document requests (step 612) desired by a particular client. For example, if the client is an employer that wants to implement a background investigation of a potential employee, the client may want to secure a release from the applicant for obtaining college transcripts. Alternatively, if the client is a lending institution, and the applicant is a borrower, the client may select a credit report release for any applicants to execute. Once the client has completed any account management changes, the process 600 returns the client to the selection interface of step 604 or the client may log out of the system (step 648).

If the client selects the option to enter information about a new applicant (step 614), the process 600 provides data entry interface (step 616) to collect applicant information. The process 600 may solicit only minimal information about an applicant, for example, name, address, telephone number, social security number, and e-mail address, in order to identify the applicant when the applicant accesses the system 10. This applicant data is saved to the client repository 42 (step 618) in the database 24 and associated with the particular client.

The process may then solicit input from the client with respect to several additional options (step 620). These options may include, for example, additional requests for information particular to the present applicant and additional document requests particular to the selected applicant. Further exemplary options for selection by the client may include whether a report concerning the particular applicant should be automatically ordered upon completion of the application by the applicant or whether the client will later manually order a report with respect to the particular applicant. Once the options have been selected by the client, the process 600 saves these options in the client repository 42 in the database 24 associated with the particular applicant (step 622). Once the process saves the options, an e-mail notification is generated and sent to the applicant (step 624), inviting the applicant to log in to the system, complete the application information, and execute any necessary documents required by the client for completion of the application process. The process 600 then returns to interface of step 604 or allows the client to terminate the session by logging out in step 648.

A further option provided for selection by the client in the client module process 600 is a review of the applicant files. If the client chooses to review the applicant files (step 626), the process 600 generates a list of applicants previously entered by the client (step 628). The client may alternatively select a particular applicant (step 630) or select multiple applicants (step 642). If the client selects a particular applicant (step 630), the process 600 displays the applicant information previously entered by the client for that particular applicant (step 632). The process 600 may additionally allow the client to access for display any application information completed by the applicant as well as any documents executed by the applicant and previously saved in the client repository 43 in the database 24 (step 634). The process may also allow the client to request additional application information or select additional documents for execution by the applicant (step 636). If the client does require additional information or documents, the process 600 may send an additional e-mail notification to the applicant (step 638) at this time to request that the applicant log back into the system and complete the additional application information. In addition, the client can also order a report with respect to the applicant (step 640) at this time if an automatic report request was not previously made.

If instead the client selects multiple applicants in step 642, the client may choose to send e-mail notifications (step 644) to all of the selected applicants at this time requesting they access the system, complete the application information, and execute the requested documents. The client may also order a report with respect to any or all of the selected applicants (step 646) in the event that the client did not previously select the automatic report generation option. The process 600 then returns to step 604 for selection of further options in the client module 600 or the session terminates on logout by the client (step 648).

FIG. 14 depicts an exemplary information provider process 700 performed by the information provider module 38. The process 700 of the information provider module 38 performs two separate processes depending upon whether the information provider logs into the system or the information provider module 38 receives instructions from either the applicant response module 36 or the client request module 34. If the information provider logs into the system 10 (step 702), the process 700 may provide a selection interface (step 704) for an action for the system to perform. Exemplary selections for an information provider may be to update contact information, update form requests, or upload new forms. The information provider may choose to update its identification information, for example, name, address, telephone numbers, e-mail address, tax identification number, and contact person information. Once the information has been entered or updated, the process 700 saves this updated information (step 706) to the information provider repository 58 in the database 24.

The information provider may also choose to update a selection of any forms requested or required by the information provider for the provision of services (step 708). An listing of particular documents or forms selected by an information provider for execution by an applicant is saved to the information provider repository 58 on the database 24. Additionally, an information provider may require that a new or revised document or form be executed by an applicant in order for the information provider to perform the requested services. In this instance, the process may provide for the information provider to upload an image file of the newly required or revised document. The process then saves the new or new or updated form to the form repository 64 with a link to the form or document saved in the information provider repository 58 in the database 24 (step 710). Once the information provider has completed any desired management functions for its account, it may log out of the system (step 712).

The process 700 of the information provider module 38 may perform a separate process upon receipt of an order request from either the applicant response module 36 or the client request module 34 (step 714). Upon receipt of such an order, the process 700 first identifies any information provider necessary to complete a report on an applicant (step 716). This identification is based upon client-specific information requests entered by the client and applicant-specific responses input by the applicant and saved in the client repository 42 in the database 24. The process 700 next selects an executed document associated with the particular applicant in the client repository 42 in the database 24 (step 718).

The process next queries the information provider repository 58 to determine whether the information provider is equipped to receive or has authorized receipt of an electronic order (step 720). If the information provider does accept electronic orders, the process 700 generates an order and forwards an executed composite image document required by the information provider with the signature analogue affixed thereto (step 722). For example, the process may prepare and send a composite PDF image with the applicant's signature analogue placed on the document to the information provider as an e-mail attachment, wherein the e-mail contains an order request. The process 700 then waits to receive information from the information provider (step 724) in response to its request in step 722. Once information is received from the information provider, the process 700 links the information received to the applicant and stores the information in the client repository 42 of the database 24 (step 726). The process 700 next notifies the report generation module 40 that information from the service provider has been received (step 728). The process of the report generation module 40 is depicted in FIG. 15 and is described in greater detail below.

Alternatively, if the process 700 identifies that an information provider has indicated that it is unable to accept an electronic order (step 720), the process 700 outputs an order and any executed documents for printing (step 730). The printed order and documents are then available for facsimile transmission or mailing to the information provider. In one embodiment, the process may automatically generate an electronic facsimile transmission to the information provider. The printed or faxed documents are executed by including the applicant's signature analogue overlaid in the appropriate position for execution of the document. Information may also be received by the research agency via facsimile or mail from the information provider (step 732). This information may be input into the system 10, e.g., by scanning the documents received and uploading them to the system 10, for completion of the process by the information provider module (step 734). As before, information now input or uploaded from an information provider into the system is linked to the particular applicant and stored in the client repository 42 of the database 24 (step 726). The report generation module 40 is then notified that information has been received from the information provider (step 728).

Figure 15:
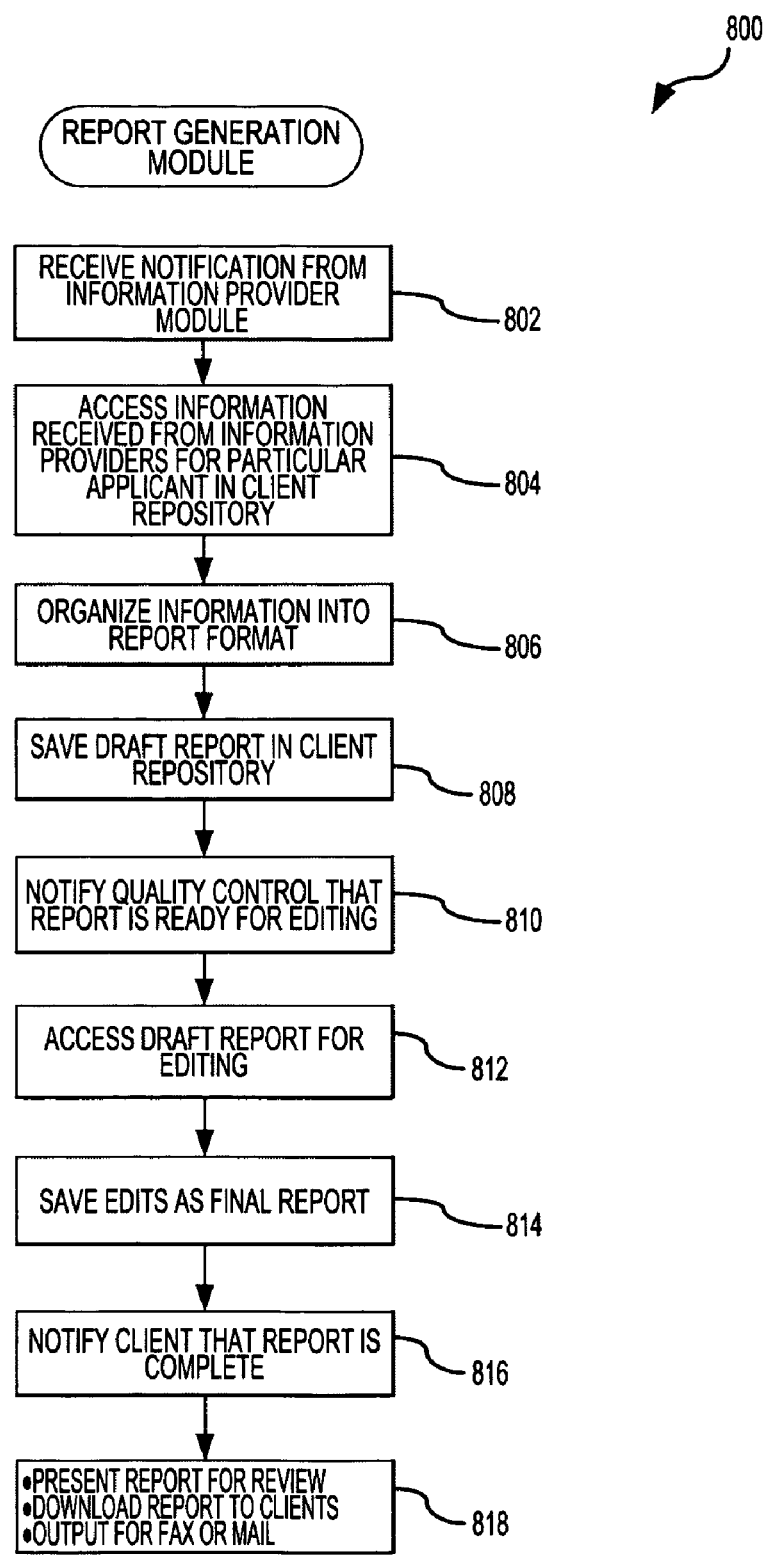
FIG. 15 is a schematic flow diagram detailing an exemplary process performed by the report generation module of FIG. 10.

An exemplary report generation process 800 implemented by the report generation module 40 is depicted in FIG. 15. The report generation process 800 begins with receipt of notification from the information provider module (step 802) of information received from a particular information provider. The process 800 continues by accessing information received from an information provider for a particular applicant from the client repository 42 in the database 24 (step 804). The information provider information is next organized along with the application information input by the applicant into a report format (step 806). A draft report is saved in the client repository 42 (step 808) and associated with the particular applicant. A notification, e.g., an e-mail, is generated and sent to a quality control entity, e.g., an employee of the research agency, indicating that the report is ready for proofing and editing (step 810). Upon request by the quality control entity, the report is accessed from the database 24 for editing (step 812). Any edits created by the quality control entity are saved as part of a final report associated with a particular applicant in the client repository section 42 of the database 24 (step 814). Upon indication that the report is in final form, the process 800 then notifies the client that the report for the particular applicant is complete (step 816), for example, by sending the client an e-mail notification. The client may either access the report from the system for viewing or the process may download the report as part of the e-mail notification, send an electronic facsimile transmission with the report to the client, or output the report by printing it for faxing or mailing to the client (step 818).

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. Connection references e.g., attached, coupled, connected, and joined are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A method for obtaining executed documents from a job applicant through a communication network to enable a potential employer to conduct a pre-employment background investigation of the job applicant, the method comprising notifying the job applicant that said pre-employment background investigation requires execution of documents;

providing a job applicant interface connected to said communication network and to a processor for input of application information by the job applicant and for capture by a processor connected to said communication network;

providing a document selection interface connected to said communication network through which the job applicant can select particular documents for execution which are stored on a database connected to said communication network and to said processor;

storing the job applicant's selection of the particular documents;

providing a job applicant signature input interface connected to said communication network and to said processor with a signature capture box that represents the movement of a graphical input device at the job applicant interface;

capturing a signature analogue corresponding to the movement of the graphical input device in the signature capture box by means of said processor;

linking the signature analogue to the particular documents selected by the job applicant; and creating a composite document image corresponding to each particular selected document, wherein the signature analogue is combined with each particular selected document, whereby each composite document image is a legally executed document.

2. The method of claim 1, wherein the step of notifying comprises sending an electronic mail message to the job applicant.

3. The method of claim 1 further comprising the step of storing the composite document image for future retrieval.

4. The method of claim 1, wherein the step of providing a signature input interface includes providing an option to erase the movement of the graphical input device in the signature capture box.

5. The method of claim 1, wherein the step of providing a document selection interface further comprises providing a document presentation interface, wherein a selected document is presented for review by the job applicant before the step of capturing the signature analogue.

6. The method of claim 1 further comprising providing an employer interface through which an employer can identify the applicant and initiate the step of notifying.

7. The method of claim 1, wherein after creating said composite document image including said signature analogue combined therewith, transmitting the composite document image over said communication network to an information provider.

8. The method of claim 7, wherein after transmitting the composite document image including said signature analogue to said information provider, transmitting background information related to the job applicant from the information provider over said communication network.

9. The method of claim 8, further comprising preparing a background investigation report incorporating the job applicant information and the background information related to the job applicant and providing the background investigation report to the potential employer.

* * * * *